United States Patent
Miura

(10) Patent No.: US 7,873,796 B2
(45) Date of Patent: Jan. 18, 2011

(54) INFORMATION PROCESSOR SYSTEM

(75) Inventor: Seiji Miura, Hachioji (JP)

(73) Assignee: Renesas Electronics Corporation, Kawasaki-Shi (JP)

( * ) Notice: Subject to any disclaimer, the term of this patent is extended or adjusted under 35 U.S.C. 154(b) by 271 days.

(21) Appl. No.: 11/292,218

(22) Filed: Dec. 2, 2005

(65) Prior Publication Data

US 2006/0179193 A1    Aug. 10, 2006

(30) Foreign Application Priority Data

Dec. 6, 2004    (JP)    ............... 2004-352928

(51) Int. Cl.
*G06F 12/00*    (2006.01)
*G06F 13/00*    (2006.01)
(52) U.S. Cl. .................. 711/147; 711/100; 711/154
(58) Field of Classification Search ................ 711/147, 711/100, 154
See application file for complete search history.

(56) References Cited

U.S. PATENT DOCUMENTS

| | | | | |
|---|---|---|---|---|
| 5,850,529 A | * | 12/1998 | Nakamura | ............... 710/108 |
| 5,875,343 A | * | 2/1999 | Binford et al. | ............. 710/263 |
| 6,204,864 B1 | | 3/2001 | Chee | ..................... 345/521 |
| 6,243,793 B1 | * | 6/2001 | Aucsmith et al. | ......... 711/151 |
| 6,282,598 B1 | | 8/2001 | Manabe | |
| 6,317,803 B1 | * | 11/2001 | Rasmussen et al. | ........ 710/107 |
| 6,340,973 B1 | | 1/2002 | Ochiai et al. | |
| 2006/0080487 A1 | * | 4/2006 | Das et al. | ................. 710/124 |

FOREIGN PATENT DOCUMENTS

| | | |
|---|---|---|
| JP | 57-25054 A | 2/1982 |
| JP | 9-231158 | 9/1997 |
| JP | 10-293744 A | 11/1998 |
| JP | 2000-35778 | 2/2000 |
| JP | 2000-172560 A | 6/2000 |
| JP | 2000-315187 | 11/2000 |
| JP | 2001-195351 A | 7/2001 |

* cited by examiner

*Primary Examiner*—Tuan V. Thai
(74) *Attorney, Agent, or Firm*—Miles & Stockbridge P.C.

(57) ABSTRACT

In an information processor system including a memory device (MEM0), a memory control device (SL0) capable of controlling an operation of the memory device, and a plurality of bus masters (MS0 to MS3) capable of giving access to the memory device through the memory control device, the memory control device includes a control circuit (SDCON) capable of giving a notice of information about a time that a data transfer from the memory device can be started to the bus master related to an access request. The bus master can cause the time information thus given to be a judgment factor as to whether an access request is given to the memory device or not. Consequently, each of the bus masters can avoid the generation of a useless access request and a data transfer to the masters to be accessed can be carried out smoothly.

4 Claims, 16 Drawing Sheets

INFORMATION PROCESSOR SYSTEM

CLAIM OF PRIORITY

The present application claims priority from Japanese Application JP 2004-352928 filed on Dec. 6, 2004, the content of which is hereby incorporated by reference into this application.

FIELD OF THE INVENTION

The present invention relates to an information processor system capable of carrying out an information processing, and to an effective technique to be applied to a device for treating image data, for example.

BACKGROUND OF THE INVENTION

As a conventional memory control method, in the case in which memory access requests given from a plurality of masters conflict with each other in an information processing device constituted by a CPU (central calculating circuit) and the other masters for accessing a memory, and the memory, for example, a processing is carried out in accordance with priority of the memory access requests. In such a memory control method, there has been known a technique for switching an access right for accessing a DRAM to transfer data in such a manner that the data of a control circuit on a host computer side to be a master for accessing a memory and a control circuit FIFO memory on a hard disk device side do not cause an overflow or an underflow (see Patent Document 1, for example).

As a memory control method of an information processing device constituted by a CPU, a liquid crystal display device and a CRT display device which are masters for accessing a memory, and the memory, moreover, there has been known a technique for giving priority to access a CPU to a DRAM and transferring data in such a manner that the data of an FIFO memory for a liquid crystal display which is provided with the CRT display device do not cause an overflow or an underflow (see Patent Document 2, for example).

As a memory control method of an information processing device constituted by a CPU and a DMA device which are masters for accessing a memory, and the memory, furthermore, there has been known a technique for giving priority to access the CPU to the DRAM and transferring data in such a manner that the data of an FIFO memory provided in the DMA device do not cause an overflow or an underflow (see Patent Document 3).

[Patent Document 1] JP-A-9-231158 Publication
[Patent Document 2] JP-A-2000-35778 Publication
[Patent Document 3] JP-A-2000-315187 Publication

SUMMARY OF THE INVENTION

The inventor made the following investigations in a control technique for implementing a dynamic image recording and reproduction and a graphic processing which will be described below.

In the recording of a dynamic image, the dynamic image picked up by an image pick-up device is converted into digital data and the digital data are once fetched into a memory device. Next, the dynamic image data thus fetched into the memory are immediately transferred to a display device so that the dynamic image is displayed. Simultaneously with this processing, the dynamic image data which are fetched are read and subjected to a compression processing and the compressed data are written to the memory again.

In case of a reproduction, the compressed data stored in the memory are read and subjected to an expansion processing, and the expanded data are written to the memory again. Then, the expanded data are read and transferred to the display device, and the dynamic image is displayed.

In the recording and reproduction of the dynamic image, thus, image pick-up, display, and compression and expansion processes are executed at the same time, and furthermore, a processing corresponding to 30 screens is to be carried out in one second. In other words, a processing corresponding to one screen is to be ended in 1/30 second.

In the graphic processing, a geometry processing is carried out and a rendering processing is then performed.

In the geometry processing, a coordinate calculation for a graphic is carried out in order to represent a three-dimensional graphic. In the rendering processing, a visual effect of a color, a brightness, a depth or a pattern is added to the graphic subjected to the geometry processing in order to carry out a display on an image display device. An image is stored in a memory, and a current image is read and the geometry processing is carried out. Then, the rendering processing is performed so that a new image is generated and stored in the memory again.

Finally, the image stored in the memory is displayed on the image display device.

In such a graphic processing, the geometry processing, the rendering processing and the display are executed at the same time. In addition, it is necessary to carry out the graphic processing corresponding to 30 screens in one second. In other words, the graphic processing corresponding to one screen is to be ended in 1/30 second.

In the prior art, however, it is impossible to guarantee that a processing on a master side is ended in a certain time. Under certain circumstances, therefore, there is a possibility that the compression processing might be delayed, a lack might be generated on picture recording data, a display screen might be disturbed or quality of an operation of an information processor system might be deteriorated.

It is an object of the invention to provide a technique for smoothly transferring necessary data to a plurality of masters for accessing a memory device.

Moreover, it is another object of the invention to provide a technique for efficiently carrying out a processing in a bus master.

The above and other objects and novel features of the invention will be apparent from the description of the specification and the accompanying drawings.

The typical summary of the invention disclosed in the application will be briefly described below.

More specifically, in an information processor system comprising a memory device, a memory control device capable of controlling an operation of the memory device, and a plurality of bus masters capable of giving access to the memory device through the memory control device respectively, the memory control device includes a control circuit capable of giving a notice of information about a time that a data transfer from the memory device can be started to the bus master related to an access request.

According to the means, the notice of the information about the time that the data transfer from the memory device can be started is given to the bus master related to the access request. The bus master can cause the given time information to be a judgment factor as to whether the access request to the memory device is generated or not. Consequently, each of the bus masters can avoid the generation of a useless access request. Thus, it is possible to smoothly carry out the data transfer to the masters for giving access to the memory device. Moreover, the notice of the information about a time that the data transfer from the memory device can be started is given to the bus master related to the access request. Consequently, each of the bus masters can flexibly adjust an internal processing so that the processing in the bus master can be carried out efficiently.

In an information processor system comprising a memory device, a memory control device capable of controlling an operation of the memory device, and a plurality of bus masters capable of giving access to the memory through the memory control device respectively, the bus master includes a function of giving the memory control device a notice of information about a maximum allowable time required for receiving request data related to the memory access.

According to the means, the notice of the information about a maximum allowable time required for receiving the request data related to the memory access is given to the memory control device. In the memory control device, consequently, priority can be changed based on the time information thus given and the data transfer deviating from the maximum allowable time can be avoided. Thus, the data transfer can be carried out smoothly.

In this case, it is possible to provide an access arbitrating device for arbitrating a confliction of access requests given from the bus masters and arbitrating the information about a maximum allowable time which are given from the bus masters.

The memory control device can have such a structure that an access order for the memory is determined based on the information about a maximum allowable time.

Furthermore, the memory control device can have such a structure as to change the access order corresponding to an access situation of the memory for the access request sent from the bus master.

The memory control device can have such a structure as to include a buffer capable of holding access request information sent from the bus master and a register capable of storing time information, and to calculate a data arrival time based on the access request information held in the buffer and the access request information held in the buffer.

In an information processor system including a memory, a memory control device capable of controlling an operation of the memory, and a plurality of bus masters capable of giving access to the memory through the memory control device respectively, moreover, the memory control device includes a buffer capable of holding an access request given from the bus master and setting a utilization right of the buffer for each of the bus masters.

It is possible to provide a flag circuit capable of reserving the utilization right of the buffer by the bus master in the memory control device.

It is possible to provide a function of canceling a reservation for the utilization right of the buffer set to a flag setting circuit.

It is possible to form the bus masters and the memory control device on one semiconductor chip.

It is possible to form the bus masters, the memory control device and the memory on one semiconductor chip.

It is possible to form the bus masters and the memory control device on a first semiconductor chip, to form the memory device on a second semiconductor chip, and to seal the first semiconductor chip and the second semiconductor chip with a common sealing member.

DETAILED DESCRIPTION OF THE PREFERRED EMBODIMENTS

First Embodiment

Figure 1:
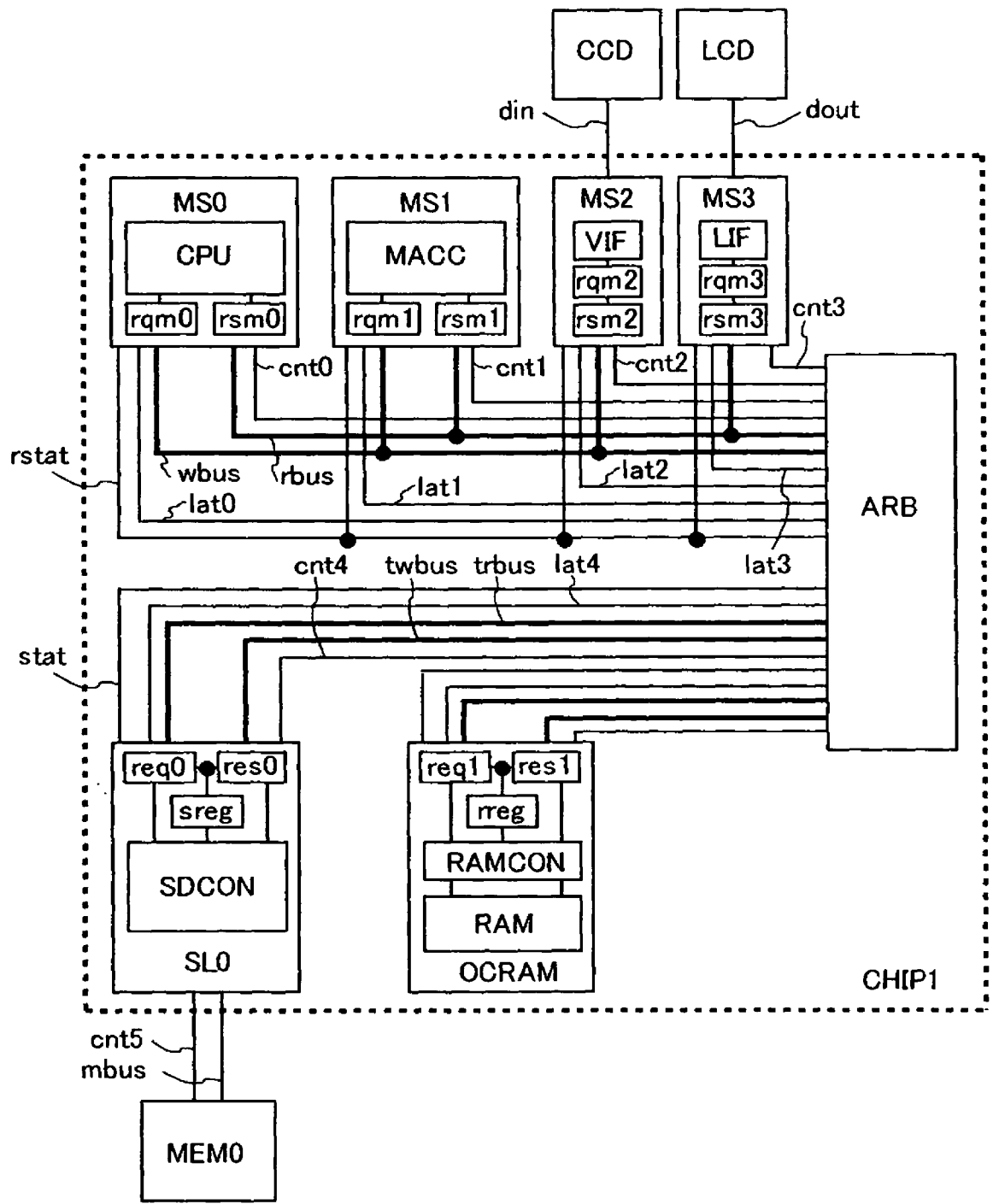
FIG. 1 is a block diagram showing an example of a whole structure of an information processor system according to the invention.

FIG. 1 shows an example of a structure of an information processor system according to the invention.

The information processor system shown in FIG. 1 comprises a microcomputer MS0 provided with a central calculating circuit CPU, an image processing device MS1 provided with a data compressing/expanding circuit MACC, a data input device MS2, a data output device MS3, an access arbitrating device ARB, an integral memory device OCRAM, a memory control device SL0, an image pick-up device CCD, an image display device LCD and a memory device MEM0 and is operated synchronously with a clock CLK, which is not particularly restricted.

The microcomputer MS0, the image processing device MS1, the data input device MS2, the data output device MS3, the access arbitrating device ARB, the memory control device SL0 and the integral memory device OCRAM are formed on the same substrate, which is not particularly restricted.

The memory device MEM0 and the integral memory device OCRAM can be constituted by a DRAM, an SRAM and a nonvolatile memory, which is not particularly restricted. The microcomputer MS0 is constituted by the central calculating circuit CPU, a request buffer rqm0 for giving an access request, and a response buffer rsm0 for responding to the access request, for example.

The image processing device MS1 is constituted by a data compressing/expanding device MACC, a request buffer rqm1 for giving an access request, and a response buffer rsm1 for responding to an access request.

The data input device MS2 is constituted to include an image input circuit VIF, a request buffer rqm2 for an access request, and a response buffer rsm2 for responding to the access request, and dynamic image data din are fetched from the image pick-up device CCD.

The data output device MS3 includes an image output device LIF, a request buffer rqm3 for an access request, and a response buffer rsm3 for responding to the access request, and dynamic image data dout are output to the image display device LCD.

The memory control device SL0 includes a memory control circuit SDCON, a register circuit sreg, a request buffer req0 for an access request, and a response buffer res0 for responding to the access request, and controls an operation of the memory device MEM0.

The integral memory device OCRAM is constituted to include a memory array RAM and a memory control circuit SDCON, a register circuit rreg, a request buffer reg1 for an access request, and a response buffer res1 for responding to the access request.

All of the microcomputer MS0, the image processing device MS1, the data input device MS2, and the data output device MS3 are set to be bus masters, and respective peculiar master identification numbers are set, and a master identification number mid of the microcomputer MS0 is set to be "0", a master identification number mid of the image processing device MS1 is set to be "1", a master identification number mid of the data input device MS2 is set to be "2", and a master identification number mid of the data output device MS3 is set to be "3".

An operation of the structure will be described.

First of all, brief description will be given to an operation in the case in which an image is recorded.

The dynamic image data din obtained by picking up an image through the image pick-up device CCD are fetched by the data input device MS2, and are transferred to the memory device MEM0 through the access arbitrating device ARB and the memory control device SL0.

The microcomputer MS0 reads the dynamic image data from the memory device MEM0 through the access arbitrating device ARB and the memory control device SL0 and the same dynamic image data are subjected to a rotation processing. A result of the processing is written to the memory device MEM0 through the access arbitrating device ARB and the memory control device SL0 again.

The data output device MS3 reads the dynamic image data subjected to the rotation processing by the microcomputer MS0 from the memory device MEM0 through the access arbitrating device ARB and the memory control device SL0, and transfers the same data to the image display device LCD for displaying a dynamic image.

The image processing device MS1 reads the image data subjected to the rotating processing by the microcomputer MS0 from the memory device MEM0 through the access arbitrating device ARB and the memory control device SL0 and carries out a data compression thereon. A result of the processing is written to the memory device MEM0 through the access arbitrating device ARB and the memory control device SL0 again.

The access arbitrating device ARB and the memory control device SL0 cooperate with each other, and control a data transfer in order to complete a necessary processing for the picture recording in a certain time and to execute the picture recording without a delay.

Next, description will be given to an access request sent from the data input device MS2 to the memory device MEM0.

The data input device MS2 sequentially fetches data on a dynamic image picked up by the image pick-up device CCD by means of the image input circuit VFD which is provided, and transfers the same data to the request buffer rqm2.

In the case in which the data are transferred from the request buffer rqm2 to the memory device MEM0, the data input device MS2 transmits the master identification number mid, a write instruction, an amount of data to be transferred (which will be hereinafter referred to as a transfer data size) and a transfer destination address as an access request through a control signal cnt2 to the access arbitrating device ARB. Furthermore, information about a time that the data transfer is to be started (which will be hereinafter referred to as a "request write latency") is transmitted through a signal lat2.

Next, description will be given to a data transfer from the memory device MEM0 to the data output device MS3. The dynamic image data stored in the memory device MEM0 are sequentially transferred to the response buffer rsm3 through the memory control device SL0 and the access arbitrating device ARB by the data output device MS3. In order to display the dynamic image by the image display device LCD, the image output circuit LIF sequentially transfers data on the dynamic image to the image display device LCD.

In the case in which the data are transferred from the memory device MEM0 to the response buffer rsm3, the data output device MS3 transmits a read instruction, a transfer data size, and a transfer source address as an access request through the master identification number mid and the control signal cnt3 to the access arbitrating device ARB, and furthermore, transmits information about a data arrival time required for receiving data (which will be hereinafter referred to as a "request read latency") through a latency signal lat3.

Next, description will be given to an access request between the microcomputer MS0 for carrying out the rotation processing and the memory device MEM0.

In the case in which data are transferred from the memory device MEM0 to the response buffer rsm0, the microcomputer MS0 transmits the master identification number mid, a read instruction, a transfer data size and a transfer source address as an access request through a control signal cnt0 to the access arbitrating device ARB, and furthermore, transmits a request read latency through a latency signal lat0.

In the case in which the data are transferred from the request buffer rqm0 to the memory device MEM0, the master identification number mid, a write instruction, a transfer data size and a transfer designation address are transmitted as an access request through the control signal cnt0 to the access arbitrating device ARB, and furthermore, a request write latency is transmitted through a latency signal lat2.

Next, description will be given to an access request between the image processing device MS1 and the memory device MEM0 in the case in which the data compression is carried out.

In the case in which the dynamic image data stored in the memory device MEM0 are transferred to the response buffer rsm1, the image processing device MS1 transmits the master identification number mid, a read instruction, a transfer data size and a transfer source address as an access request through the control signal cnt1 to the access arbitrating device ARB, and furthermore, transmits a request read latency through a latency signal lat1.

In the case in which data are transferred from the request buffer rqm1 to the memory device MEM0, the master identification number mid, the write instruction, the transfer data size, and the transfer destination address are transmitted as an access request through the control signal cnt1 to the access arbitrating device ARB, and furthermore, a request write latency is transmitted through the latency signal lat1.

In the case in which the access request given from each of the bus masters of the microcomputer MS0, the image processing device MS1, the data input device MS2 and the data output device MS3 is accepted by the request buffer req0, the memory control device SL0 transmits information about a time that a data transfer to the memory device MEM0 can be started (which will be hereinafter referred to as a "transfer enable write latency") and information about a time that a data transfer from the memory device MEM0 can be started (which will be hereinafter referred to as a "transfer enable read latency") through a status signal stat to the access arbitrating device ARB in advance. The transfer enable write latency and the transfer enable read latency are always transmitted through a status signal rstat to the microcomputer MS0, the image processing device MS1, the data input device MS2 and the data output device MS3.

Furthermore, the memory control device SL0 transmits information indicating the degree of a vacant state of the request buffer req0 for an access request (which will be hereinafter referred to as "the number of vacant buffers") to the access arbitrating circuit ARB through the status signal stat, and furthermore, the access arbitrating circuit ARB transmits the information of the status signal stat through the status signal rstat.

Consequently, the microcomputer MS0, the image processing device MS1, the data input device MS2 and the data output device MS3 can always know a data arrival time and a state of the request buffer req0. Therefore, it is possible to flexibly regulate the extent of a next processing to be carried out in advance before the data arrival time. Thus, it is possible to efficiently perform the processing in the master.

In the access arbitrating device ARB, moreover, in the case in which an access request and a request write latency or a request read latency of each of the microcomputer MS0, the image processing device MS1, the data input device MS2 and the data output device MS3 are input therefrom at the same time and access conflicts, the access arbitrating device ARB first decides whether the request buffer req0 is vacant or not. If the request buffer req0 is not vacant, the access request is not given to the memory control device SL0. If the request buffer req0 is vacant, the request read latency is compared with the transfer enable read latency sent from the memory control device SL0 in the case in which an instruction for the access request is a read instruction. The request read latency selects only an access request which is equal to or smaller than the transfer enable read latency.

In the case in which the instruction for the access request is a write request, moreover, the request write latency is compared with the transfer enable write latency sent from the memory control device SL0. There is selected only an access request in which the request write latency is equal to or smaller than the transfer enable write latency.

In the access request selected as described above, subsequently, first access priority levels for the respective masters (the microcomputer MS0, the image processing device MS1, the data input device MS2 and the data output device MS3) which are provided in the access arbitrating device ARB are compared with each other and an access request having the highest priority level is further selected.

In the case in which only one access request having the highest priority level is present, an access permission is given to the access request. In the case in which a plurality of access requests having the same priority level is present, moreover, the access permission is given to an access request having the smallest difference between the request write latency and the transfer enable write latency or between the request read latency and the transfer enable read latency in the access request which is selected.

In the case in which the access request to which the access permission is given by the access arbitrating device ARB is the read access request sent from the image processing device MS1, the master identification number mid, the read instruction, the transfer data size and the transfer source address are transferred to the request buffer req0 of the memory control device SL0 through the control signal cnt4.

Thus, whether the request is satisfied is decided for the request read latency sent from the master side, and furthermore, the access permission is given to the access request having the smallest difference between the request read latency and the enable read latency. Consequently, it is possible to process a request having a high emergency degree with priority while satisfying the request read latency.

In the case in which the memory control device SL0 receives an access request including the read instruction of the image processing device MS1 into the request buffer req0, for example, the memory control circuit SDCON calculates an actual read latency (which will be hereinafter referred to as an "actual read latency") for the access request received currently and the number of vacant buffers immediately thereafter.

The actual read latency, the number of vacant buffers and the master identification number mid of the image processing device MS1 are transferred to the access arbitrating device ARB through a signal lat04, the signal stat and the control signal cnt4, respectively.

The access arbitrating device ARB transfers, to the image processing device MS1, the actual read latency sent from the memory control circuit SDCON, the number of vacant buffers and the master identification number mid through the latency signal lat1, the signal rstat and the control signal cnt1, respectively.

Moreover, the memory control device SL0 transmits a transfer enable write latency and a transfer enable read latency in which a next access request is accepted by the request buffer req0 through the signal stat to the access arbitrating device. These latencies are transmitted to the microcomputer MS0, the image processing device MS1, the data input device MS2 and the data output device MS3 through the access arbitrating device ARB via the signal rstat.

Finally, the memory control circuit SDCON reads the dynamic data stored in the memory device MEM0 and transfers the same dynamic data to the response buffer res0. The data read by the response buffer res0 are transferred to the access arbitrating device ARB through a data bus trbus. The access arbitrating device ARB transfers the data read from the memory control device SL0 to the response buffer rsm1 of the image processing device MS1 to be a request source through a data bus rbus.

In the example, the description has been given to the control method in the case in which the access request of the image processing device MS1 is permitted and the access is given to the memory device MEM0. The same control is carried out for access to be given to the integral memory device OCRAM. Moreover, the same control is carried out over other masters for giving access to the memory device MEM0 and the integral memory device OCRAM.

Next, description will be given to the more detailed structure and operation of the main part.

Figure 2:
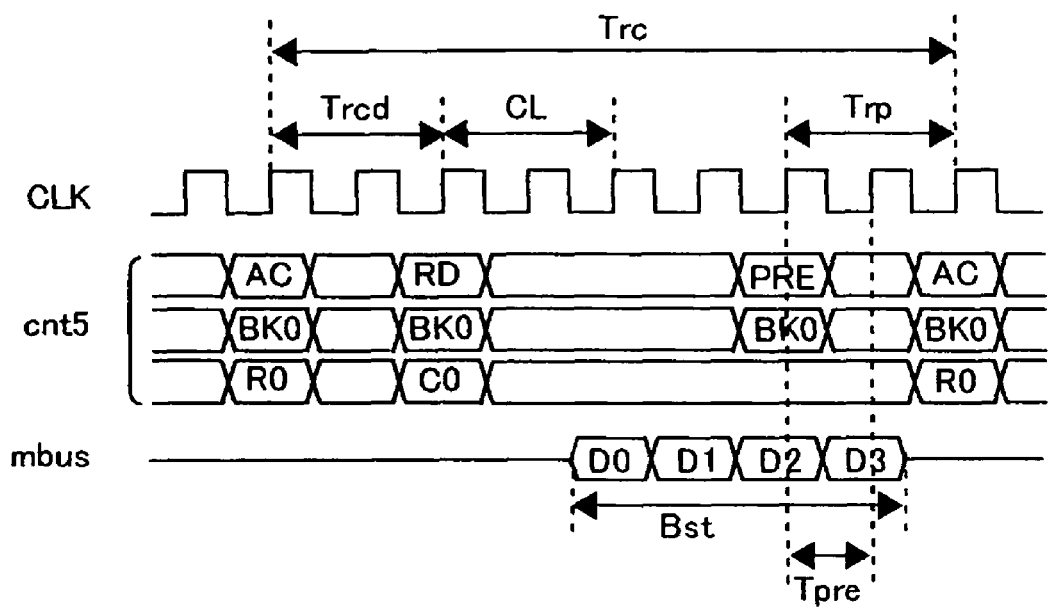
FIG. 2 is an operation timing chart showing a main part of the information processor system.
Figure 3:
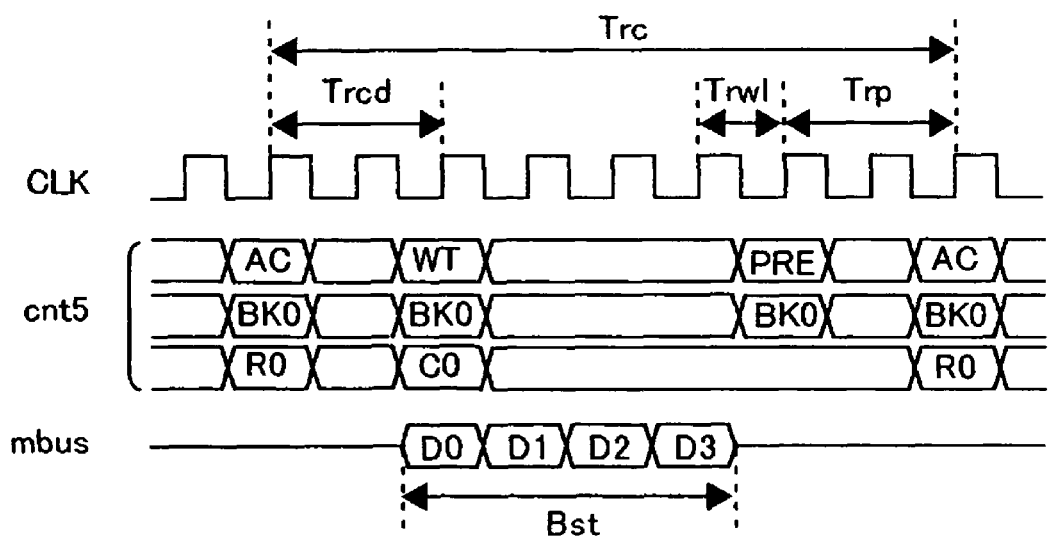
FIG. 3 is an operation timing chart showing the main part of the information processor system.

FIG. 2 shows an operation to be carried out when reading the data from the memory device MEM0. Moreover, FIG. 3 shows an operation to be carried out when writing the data to the memory device MEM0.

While it is possible to use, for the memory device MEM0, a volatile memory such as an EDO-DRAM, an SDRAM, a DDR-SDRAM, an SRAM or a dummy SRAM and a nonvolatile memory such as an MRAM or a phase change memory, the reading and writing operations of the memory will be described by taking the SDRAM as an example. A bus width of an input/output data bus mbus of the SDRAM is not particularly restricted. Description will be given by setting the same bus width to be 32 bits and a cycle of an operating clock to be 7.5 ns.

Moreover, a minimum time between respective instructions for operating the SDRAM is determined in accordance with an operation specification of the SDRAM and various combinations can be implemented. In the example, description will be given to the case in which a minimum time Trcd between a bank active instruction AC and a reading instruction RD is set to have a 2-clock cycle, and a caslatency CL indicative of a time from the read instruction RD to a data output is set to have a 2-clock cycle, a maximum time Tpre from final output data to a precharge instruction is set to have a 1-clock cycle, a minimum time Trp from the precharge instruction to a next bank active instruction is set to have a 2-clock cycle, a minimum time Trc between the bank active instructions AC is set to have a 6-clock cycle, and a minimum time Trw1 from a final data input to a precharge instruction PRE in a write operation is set to have a 2-clock cycle.

Furthermore, a data transfer size included in the access request given from the master can be implemented variously. In the example, description will be given to the case in which the data transfer size is 16 Bytes. One clock cycle represents a time corresponding to one cycle of an operation clock.

When reading data from the memory device MEM0, the memory control device SL0 outputs the bank active instruction AC, the read instruction RD and the precharge instruction PRE as instructions and a bank address BK0, a row address R0 and a column address C0 as addresses via the control signal cnt5 as shown in FIG. 2.

When the read instruction is output, data D0 to D3 are transferred to the memory control device SL0 through an input/output data bus mbus after two cycles obtained by a clock CLK conversion. A data transfer number Bst is four because a bus width of the input/output data bus mbus of the SDRAM is 32 bits, that is, 4 Bytes and a data transfer size required by the master is 16 Bytes.

When writing the data to the memory device MEM0, subsequently, the memory control device SL0 outputs the bank active instruction AC, the write instruction WT and the precharge instruction PRE as instructions and the bank address BK0, the row address R0 and the column address C0 as addresses via the control signal cnt5 as shown in FIG. 3.

At the same time that the write instruction is output, the data D0 to D3 are sequentially transferred to the memory device MEM0 through the input/output data bus mbus. The data transfer number Bst is four because the bus width of the input/output data bus mbus of the SDRAM is 32 bits, that is, 4 Bytes, and a data transfer size required by a request source is 16 Bytes.

Figure 4:
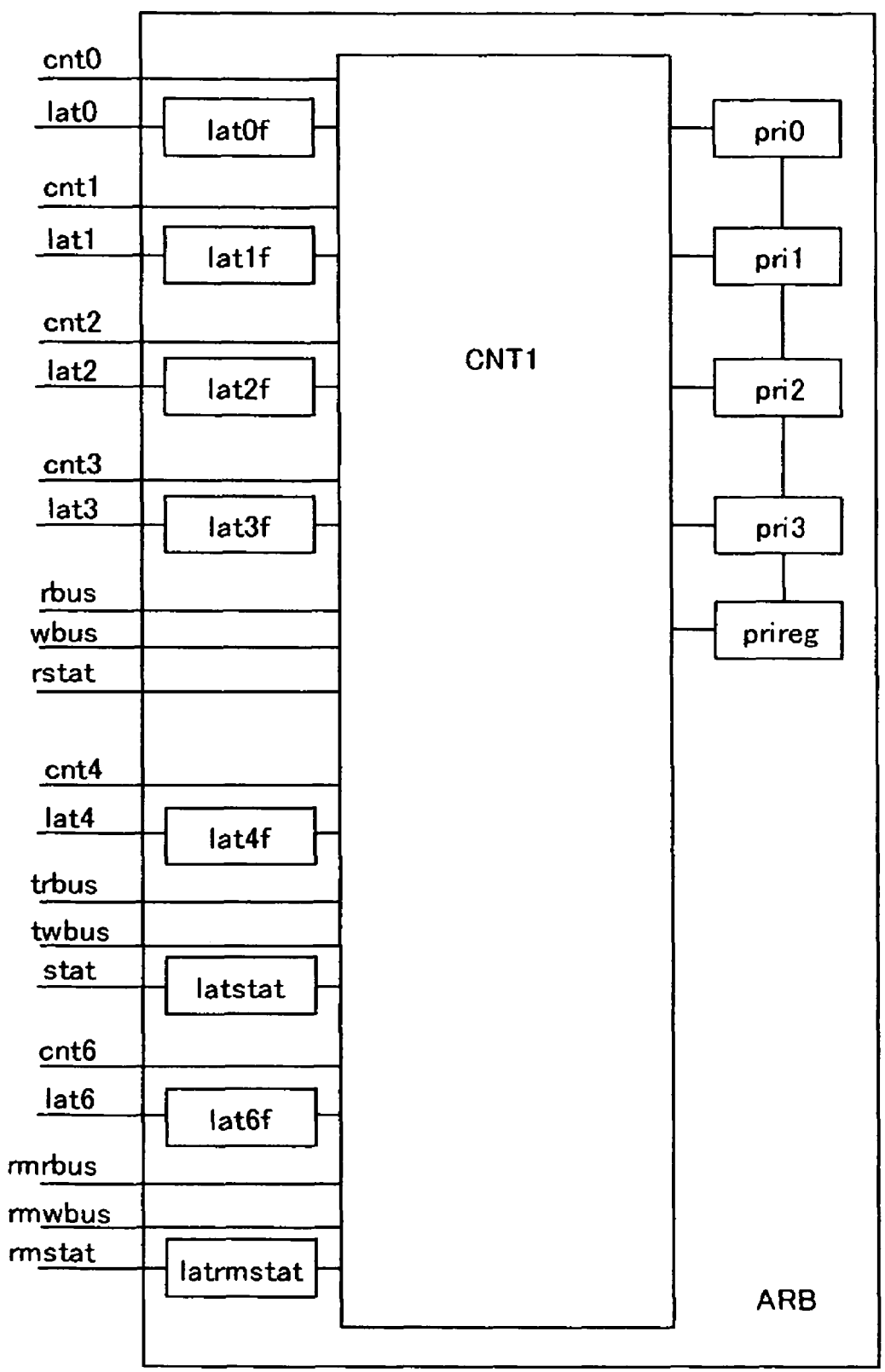
FIG. 4 is a block diagram showing an example of a structure of an access arbitrating device included in the information processor system.

FIG. 4 shows an example of a structure of the access arbitrating device ARB according to the example.

This circuit is constituted by latency holding circuits (lat0f, lat1f, lat2f, lat3f, lat4f and lat6f), status signal holding circuits latstat and latrmstat, first access priority level circuits (pri0, pri1, pri2 and pri3), a first access priority level register prireg, and an access permitting circuit CNT1.

A control signal cnt0 and a latency signal lat0 are connected to the microcomputer MS0, a control signal cnt1 and a latency signal lat1 are connected to the image processing device MS1, a control signal cnt2 and a latency signal lat2 are connected to the data input device MS2, and a control signal cnt3 and a latency signal lat3 are connected to the data output device MS3, and a control signal cnt4 and a latency signal lat4 are connected to a memory control device SL0 and a control signal cnt6 and a latency signal lat6 are connected to the integral memory device OCRAM.

Moreover, the data buses rbus and wbus and the status signal rstat are connected to the microcomputer MS0, the image processing device MS1, the data input device MS2 and the data output device MS3, data buses trbus and twbus and the status signal stat are connected to the memory control device SL0, and data buses rmrrbus and rmwwbus and a status signal rmstat are connected to the integral memory device OCRAM, respectively.

The latency holding circuit lat0f holds a value of the latency signal lat0, the latency holding circuit lat1f holds a value of the latency signal lat1, the latency holding circuit lat2f holds a value of the latency signal lat2, the latency holding circuit lat3f holds a value of the latency signal lat3, and the latency holding circuit lat6f holds a value of the latency signal lat6.

A first access priority level circuit pri0 determines a first access priority level of the microcomputer MS0, a first access priority level circuit pri1 determines a first access priority level of the image processing device MS1, a first access priority level circuit pri2 determines a first access priority level of the data input device MS2, and a first access priority level circuit pri3 determines a first access priority level of the data output device MS3.

The priority levels of the first access priority level circuits pri0 to pri3 are not particularly restricted but the microcomputer MS0 programs the priority levels of the respective request sources into the access priority level register prireg and is thus initialized. Furthermore, the first access priority level circuits pri0 to pri3 can dynamically change the priority levels by a permission and a nonpermission for the access request of the master.

Next, description will be given to an operation of the access arbitrating device ARB.

After a power supply is turned ON, the microcomputer MS0 writes the first access priority levels of all of the bus masters to the access priority level register prireg. The first access priority level circuits (pri0, pri1, pri2 and pri3) refer to the access priority level register prireg, thereby setting the first access priority level.

In the case in which the access request is accepted by the request buffer req0, the memory control device SL0 transmits a transfer enable write latency or a transfer enable read latency to the access arbitrating device through the status signal stat. Furthermore, the memory control device SL0 transmits the number of vacant buffers of the current request buffer req0 through the status signal stat. The transfer enable write latency or the transfer enable read latency and the number of vacant buffers are held in the status signal holding circuit latstat.

The microcomputer MS0, the image processing device MS1, the data input device MS2 and the data output device MS3 input the respective access requests to the access arbitrating device ARB through the control signals cnt0, cnt1, cnt2 and cnt3, and at the same time, input the request read latency or the request write latency to the access arbitrating device ARB through the latency signals lat0, lat1, lat2 and lat3. Values sent through the latency signals lat0, lat1, lat2 and lat3 are held in the latency holding circuits lat0f, lat1f, lat2f, lat3f and lat4f, respectively.

In the case in which the access requests given from these masters conflict with each other, first of all, the access enable circuit CNT1 ascertains whether or not the request buffer req0 is vacant through the status signal held in the status signal holding circuit latstat. If the request buffer req0 is not vacant, the access request is not given to the memory control circuit SL0. If the request buffer req0 is vacant, the request read latency held in the latency holding circuit (lat0f, lat1f, lat2f, lat3f, lat4f) is compared with a transfer enable read latency held in the status signal holding circuit latstat in the case in which the access request is a read request. There is selected only an access request in which the request read latency is equal to or smaller than the transfer enable read latency.

In the case in which the access request is a write request, moreover, the request write latency held in the latency holding circuit (lat0f, lat1f, lat2f, lat3f, lat4f) is compared with the transfer enable write latency held in the status signal holding circuit latstat. The request write latency selects only an access request which is equal to or smaller than the transfer enable write latency.

Next, the first access priority levels held in the first access priority level circuits (pri0, pri1, pri2 and pri3) for the access request selected as described above are compared with each other, and an access request having the highest priority level is further selected.

In the case in which only one access request having the highest priority level is present, a data transfer permission is given to the same access request. In the case in which a plurality of access requests having the same priority level is present, moreover, an access permission is given to any of the selected access requests which has the smallest difference between the request write latency held in the latency holding circuit and the transfer enable write latency or the smallest difference between the request read latency and the transfer enable read latency.

In the case in which the access request to which the access permission is finally given by the access permitting circuit CNT1 includes a write instruction sent from the image processing device MS1, the access permitting circuit CNT1 transfers the access request including the write instruction to the memory control device SL0 through the signal cnt4. At the same time, the write data input to the access permitting circuit CNT1 through the data bus wbus are transferred to the memory control device SL0 through the write data bus twbus.

The access permitting circuit CNT1 sets the priority level of the first access priority level circuit corresponding to the master in which the access request is permitted to have the smallest value. Moreover, there is raised the priority level of the first access priority level circuit corresponding to the master in which the access request is not permitted.

Figure 5:
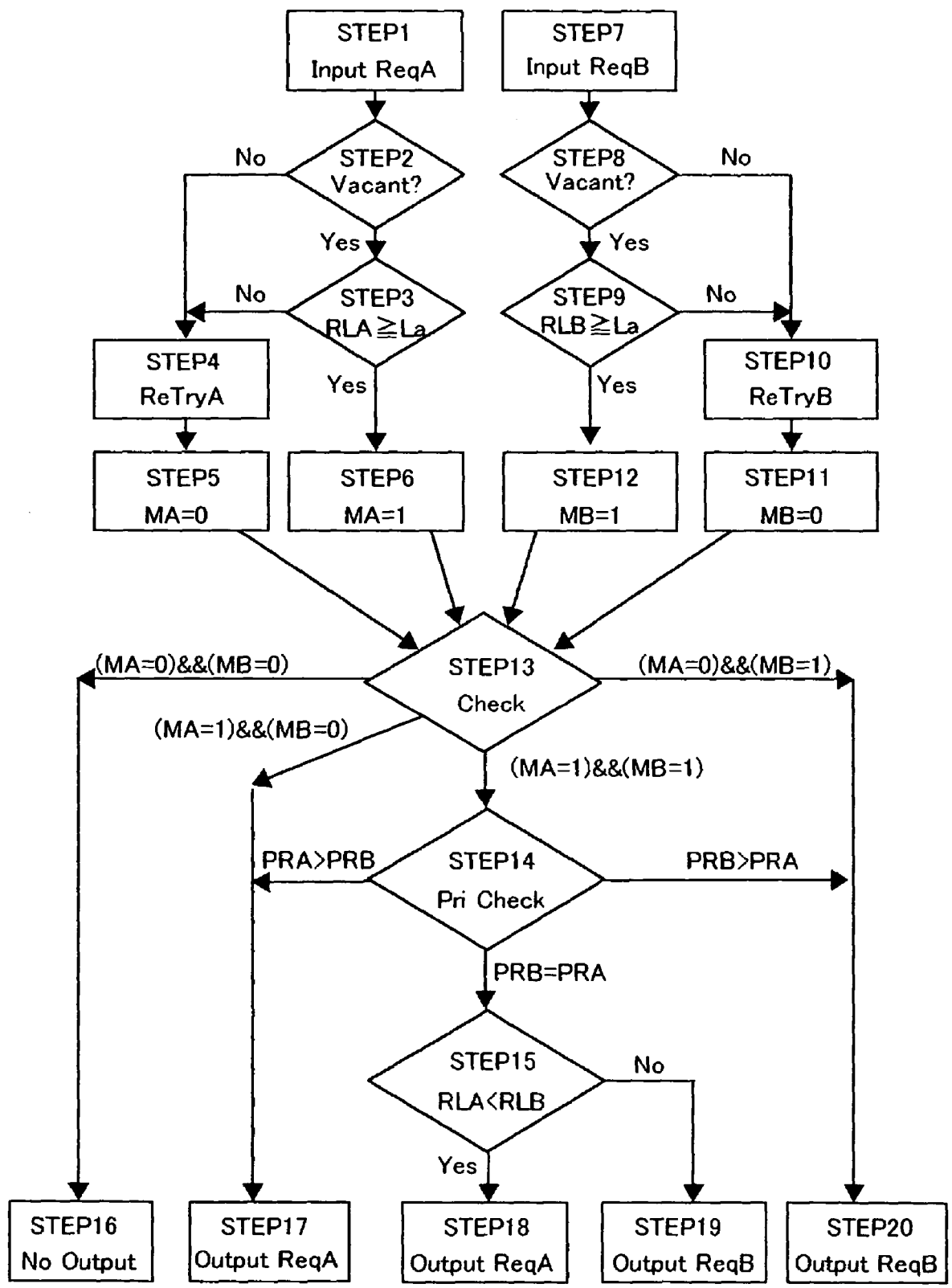
FIG. 5 is a flowchart showing an operation of the access arbitrating device.

FIG. 5 is a flowchart for explaining an access arbitrating operation to be carried out by the access arbitrating device ARB in the example.

An access request A including a read instruction is input to the access arbitrating device ARB at STEP 1 and an access request B including the read instruction is input at STEP 7, and an operation is thus started. It is ascertained whether the request buffer req0 is vacant or not at STEP 2 and STEP 8. If the request buffer req0 is not vacant, the processing proceeds to STEP 4. If the request buffer req0 is vacant, the processing proceeds to STEP 3. At the STEP 3, a request read latency RLA of the access request A is compared with a transfer enable read latency La. If the request read latency RLA is smaller than the transfer enable latency La, that is, data cannot be transferred into the request read latency, the processing proceeds to the STEP 4. If the request latency RLA is equal to or greater than the transfer enable latency La, that is, the data can be transferred into the request latency RLA, the processing proceeds to STEP 6.

At the STEP 4, the execution of a re-request is transmitted to the master giving the access request A. When the STEP 4 is ended, the processing proceeds to STEP 5. At the STEP 5, a signal MA is set to be zero.

At the STEP 6, the signal MA is set to be one.

At STEP 9, a request read latency RLB of the access request B is compared with the transfer enable read latency La. If the request read latency RLB is smaller than the transfer enable read latency La, that is, data cannot be transferred into the request read latency, the processing proceeds to STEP 10. If the request read latency RLA is equal to or greater than the transfer enable read latency La, that is, the data can be transferred into the request read latency RLB, the processing proceeds to STEP 12. At the STEP 10, a notice of the execution of a re-request is given to the master issuing the access request B. When the STEP 10 is ended, the processing proceeds to STEP 11. At the STEP 11, a signal MB is set to be zero.

At the STEP 12, the signal MB is set to be one.

When the STEP 5, the STEP 6, the STEP 11 or the STEP 12 is ended, the processing proceeds to STEP 13.

At the STEP 13, the values of the signals MA and MB are checked. If the signal MA is zero and the signal MB is zero, that is, neither the request read latency RLA nor RLB is satisfied, the processing proceeds to STEP 16. If the signal MA is one and the signal MB is zero, that is, the request read latency RLA is satisfied and the request read latency RLB is not satisfied, the processing proceeds to STEP 17. If the signal MA is one and the signal MB is one, that is, both of the request read latencies RLA and RLB are satisfied, the processing proceeds to STEP 14. If the signal MA is zero and the signal MB is one, that is, the request read latency RLA is not satisfied and the request read latency RLB is satisfied, the processing proceeds to STEP 20.

At the STEP 16, the access arbitrating device ARB outputs neither of the requests to the memory control circuit. At the STEP 17, only the read access request A is permitted and output. At the STEP 20, only the access request B is permitted and output.

At the STEP 14, the first access priority level PRA of the access request A is compared with the first access priority level RPB of the access request B. If the first access priority level PRA of the access request A is higher than the first access priority level PRB of the access request B, the processing proceeds to the STEP 17. If the first access priority level PRA of the access request A is lower than the first access priority level PRB of the access request B, the processing proceeds to the STEP 20. If the first access priority level PRA of the access request A is equal to the first access priority level PRB of the access request B, the processing proceeds to STEP 15.

At the STEP 15, the values of the request read latencies RLA and RLB are compared with each other. If the request read latency RLA is smaller than the request read latency RLB, the processing proceeds to STEP 18. If the request read latency RLA is equal to or greater than the request read latency RLB, the processing proceeds to STEP 19.

At the STEP 18, only the access request A is permitted and output. At the STEP 19, only the access request B is permitted and output.

Figure 6:
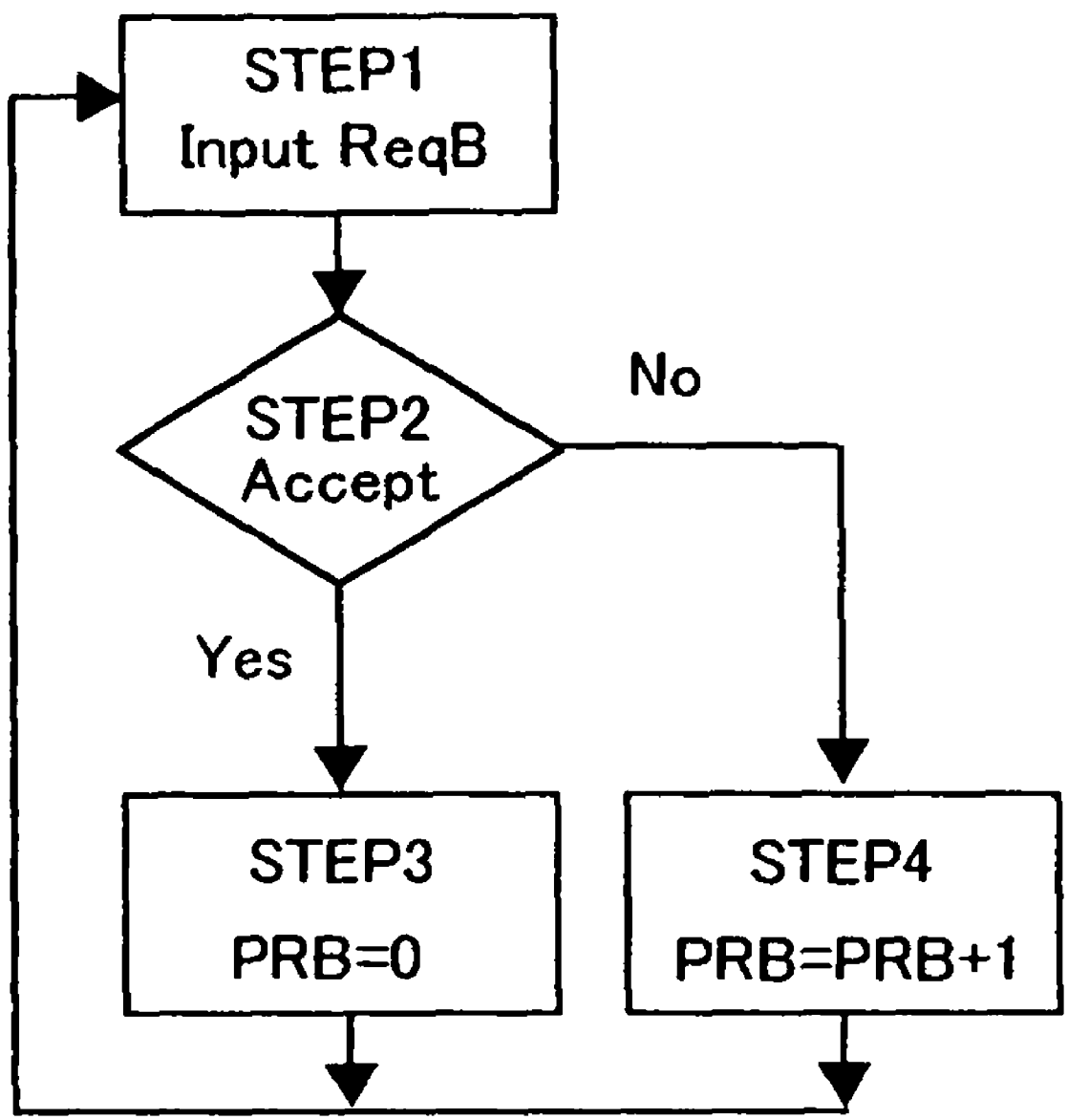
FIG. 6 is a flowchart showing the operation of the access arbitrating device.

FIG. 6 is a flowchart for explaining an operation on a first access priority level which is to be carried out by the first access priority level circuits pri0, pri1, pri2 and pri3 in the access arbitrating device ARB.

Description will be given on the assumption that the first access priority level has stages of 0 to 15, and a greater numeric value has a higher priority level and an initialization is 6, which is not particularly restricted.

At STEP 1, the access request B is input from the image processing device MS1 to the access arbitrating device ARB so that an operation is started.

At STEP 2, a permission and a nonpermission of the access request B are checked. If the access request B is permitted, the processing proceeds to STEP 3. If the access request B is not permitted, the processing proceeds to STEP 4. At the STEP 3, the value PRB of the access priority level of the first access priority level circuit pri1 is set to be the smallest, that is, zero. At the STEP 4, the value PRB of the access priority level is increased by one so as to be seven.

Figure 7:
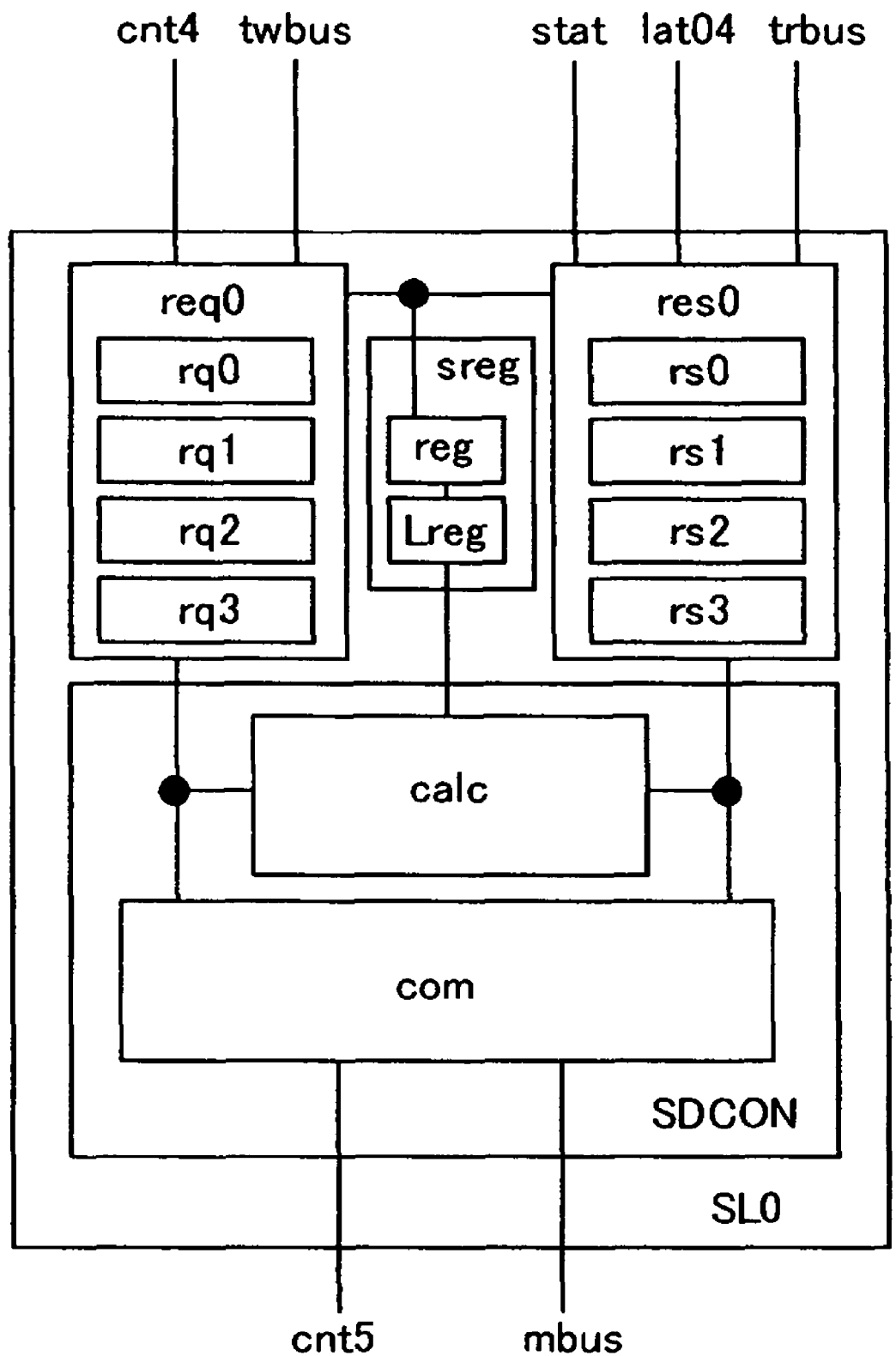
FIG. 7 is a block diagram showing an example of a structure of a memory control circuit.

FIG. 7 shows an example of a structure of the memory control device SL0.

The memory control device SL0 is constituted by the request buffer req0, the response buffer res0, the register circuit sreg and the memory control circuit SDCON as shown in FIG. 7.

The request buffer req0 is constituted by buffers rq0, rq1, rq2 and rq3. The response buffer res0 is constituted by buffers rs0, rs1, rs2 and rs3. The register circuit sreg is constituted by a register circuit reg and a latency register circuit Lreg. The memory control circuit SDCON is constituted by a latency calculating circuit calc and a command generating circuit corn.

Immediately after the power supply is turned ON, a minimum time (Trc, Trcd, Trp, Trw1, Tpre) between instructions for operating the SDRAM, the caslatency CL and the bus width of the input/output data bus mbus of the SDRAM are set to be 4 Bytes in the register circuit reg by the microcomputer MS0, for example (see FIGS. 2 and 3). Next, the latency calculating circuit calc calculates a latency LacRd in reading, a latency LacWt in writing, a read cycle latency Rcyc and a write cycle latency Wcyc by using the minimum time (Trc, Trcd, Trp and Trw1) between the instructions and the caslatency CL, and sets them to the latency register circuit Lreg.

The latency LacRd in reading is calculated by (Trcd+CL−1), the latency LacWt in writing is calculated by Trcd, the read cycle latency Rcyc is calculated by (the latency LacRd+Bstmax−Tpre+Trp) in reading, and the write cycle latency Wcyc is calculated by (Trcd−1+Bstmax+Trw1+Trp). If a maximum data transfer size which can be accepted by the memory control circuit SDCON is 32 Bytes and the data bus width of the SDRAM is 4 Bytes, Bstmax is 8 (=32 Bytes/4 Bytes).

Next, description will be given to an operation to be carried out in the case in which both of the request buffer req0 and the response buffer res0 of the memory control device SL0 are vacant and the access request is waited.

A transfer enable read latency LaRNext in the case in which the access request is accepted at the present time, a transfer enable write latency LaWNext, and the number of any of current request buffers which are vacant, that is, the number of vacant buffers are transmitted through the control signal stat while the memory control device SL0 waits for a request. In case of the example, all of the buffers req0 to req3 are vacant request buffers. Therefore, the number of the vacant buffers is four.

The transfer enable read latency LaRNext and the transfer enable write latency LaWNext are calculated by the calculating circuit calc. A calculating method will be described below. The transfer enable read latency LaRNext is a sum of the latency LacRd in reading, the read cycle latency Rcyc and an execution waiting latency preLa. Moreover, the transfer enable write latency LaWNext is a sum of the latency LacWt in writing, a write cycle latency Wcyc and the execution waiting latency preLa.

The execution waiting latency preLa is a sum of latencies for a request which has already been received before the receipt of a current access request and is held in the buffers rq0 to rq3, and is set in an execution waiting state. Accordingly, the access request is held in neither of the buffers rq0 to rq3. Therefore, the execution waiting latency preLa is zero.

Next, description will be given to an operation to be carried out in the case in which the memory control device SL0 receives an access request of 16 Bytes in accordance with a load instruction.

A read instruction, a data transfer size (16 Bytes) and a transfer source address are held in the request buffer req0 of the memory control circuit SDCON and the receipt of the access request is thus completed. Immediately after the receipt, the latency calculating circuit calc calculates an actual latency LaAc in which data actually reach the master issuing the request and the number of vacant request buffers Vreq. Furthermore, the transfer enable read latency LaRNext and the transfer enable write latency LaWNext latency are calculated to prepare for a next access request. Then, the number of vacant request buffers Vreq is decreased by one so as to be 3 (=4−1) and is transferred to the access arbitrating device ARB through the signal stat, and the actual latency LaAc is transferred to the access arbitrating device ARB through the signal lat4 and the transfer enable read latency LaRNext and the transfer enable write latency LaWNext latency are transferred to the access arbitrating device ARB through the signal stat.

Next, a method of calculating the actual latency LaAc will be described below.

In case of a read instruction, the actual latency LaAc is a sum of the latency LacRd in reading and the execution waiting latency preLa. In case of a store instruction, the actual latency LaAc is a sum of the latency LacWt in writing and the execution waiting latency preLa. At this time, an execution waiting access request is not held in the buffers req0 to req3 before a current access request is received. Therefore, the execution waiting latency preLa is zero. After the actual latency LaAc is calculated, the execution waiting latency preLa is updated. Description will be given to an operation for newly calculating and updating the execution waiting latency preLa.

The latency calculating circuit calc newly calculates the execution waiting latency preLa and carries out an update in order to calculate the actual latency LaAc in the receipt of a next access request and to calculate the transfer enable read latency LaRNext and the transfer enable write latency LaWNext. The new execution waiting latency preLa is a sum of the latency LacRd in reading and the actual cycle latency RcyAc.

Next, description will be given to a method of calculating the transfer enable read latency LaRNext and the transfer enable write latency LaWNext.

The transfer enable read latency LaRNext is a sum of the latency LacRd in reading, the read cycle latency Rcyc and the updated execution waiting latency preLa.

Moreover, the transfer enable write latency LaWNext is a sum of the latency LacWt in writing, the write cycle latency Wcyc and the updated execution waiting latency preLa.

The command generating circuit corn outputs the bank active instruction AC, the read instruction RD and the precharge instruction PRE as instructions and the bank address BK0, the row address R0 and the column address C0 as addresses through the control signal cnt5 based on the read instruction, the data transfer size (16 Bytes) and the address information which are input to the request buffer req0 as shown in FIG. 2, and reads data of 16 Bytes from the memories M0 and M1 through the input/output data bus mbus.

The data thus read are transferred to the response buffer rs0 through the command generating circuit corn, and furthermore, are transferred to the access arbitrating device ARB through the read data bus trbus.

The description has been given to the operation to be carried out in the case in which the read instruction is received. In the case in which the write instruction is received, the write data are also received at the same time. The command generating circuit corn outputs the bank active instruction AC, the write instruction WT and the precharge instruction PRE as instructions and the bank address BK0, the row address R0 and the column address C0 as addresses through the control signal cnt5 as shown in FIG. 3 and writes data of 16 Bytes to the memory device M0 through the input/output data bus mbus. Moreover, the latency calculating circuit calc carries out the same operation as the operation to be carried out in the case in which the read instruction is received.

Figure 8:
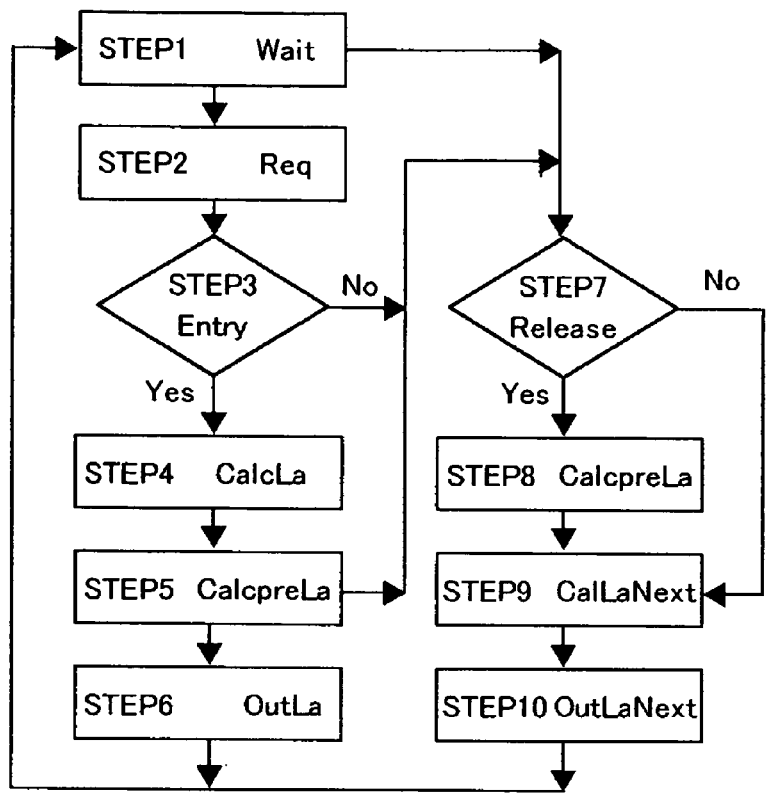
FIG. 8 is a flowchart showing an operation of a memory control circuit.

FIG. 8 is a flowchart for explaining an operation in which the latency to be calculated by the memory control circuit SDCON is given to the access arbitrating device.

At STEP 1, the memory control device SL0 is waiting for an access request.

At STEP 7, the execution of the access request held in the buffers req0 to req3 is completed and it is then decided whether a vacant state is newly generated in the buffers req0 to req3. In the case in which the vacant state of the buffers req0 to req3 is newly generated, the processing proceeds to STEP 8. If the vacant state is not generated, the processing proceeds to STEP 9.

At the STEP 8, the execution waiting latency preLa is calculated and updated. After the STEP 8 is ended, the processing proceeds to the STEP 9.

At the STEP 9, the newest execution waiting latency preLa is utilized to calculate the transfer enable read latency LaRNext and the transfer enable write latency LaWNext. When the STEP 9 is ended, the processing proceeds to STEP 10.

At the STEP 10, the transfer enable read latency LaRNext and the transfer enable write latency LaWNext are output.

At the STEP 2, the access request is generated in the memory control device SL0. At the STEP 3, it is decided whether the access request can be received or not. If the request can be received, the processing proceeds to STEP 4. If the request cannot be received, the processing proceeds to the STEP 7. An actual latency LaAc is calculated at the STEP 4 and an execution waiting latency preLa is calculated at STEP 5, and an update is carried out. When the STEP 5 is ended, the processing proceeds to STEP 6. At the STEP 6, the actual latency LaAc thus calculated is output.

Figure 9:
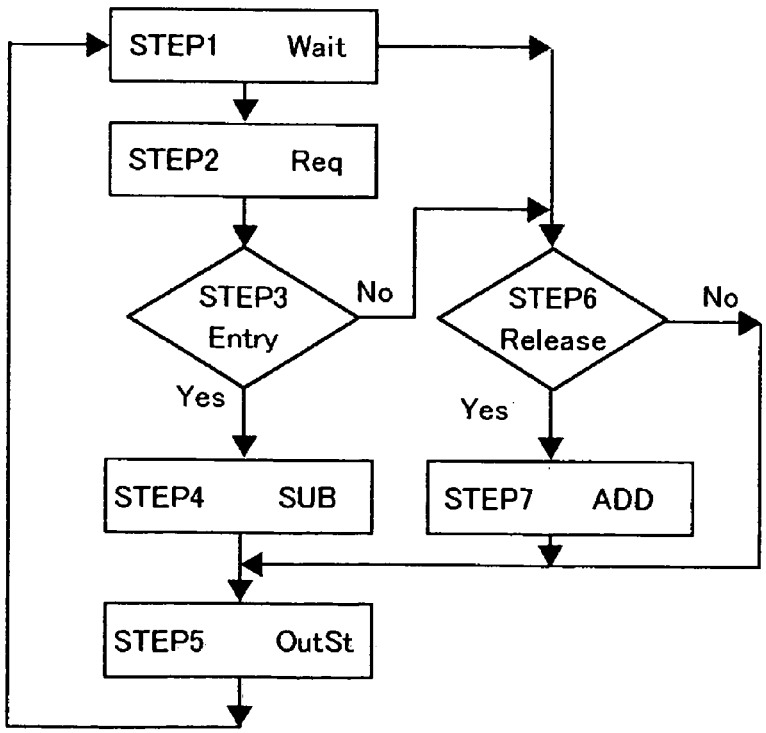
FIG. 9 is a flowchart showing the operation of the memory control circuit.

FIG. 9 is a flowchart showing an operation for giving the number of vacant buffers which is to be carried out by the memory control device SL0.

At STEP 1, the memory control circuit SDCON is waiting for an access request. At STEP 2, the access request is generated in the memory control circuit SDCON.

At STEP 3, it is decided whether the access request can be received or not. It the access request can be received, the processing proceeds to STEP 4. If the access request cannot be received, the processing proceeds to STEP 6. The number of vacant buffers is decreased by one at the STEP 4 and the number of vacant buffers is output at STEP 5.

At STEP 6, access requests held in the buffers rq0 to rq3 are executed and completed, and it is decided whether a vacant state is newly brought in the buffers rq0 to rq3 or not. If the vacant state is generated, the processing proceeds to STEP 7. If the vacant state is not generated, the processing proceeds to STEP 5.

The number of vacant request buffers Vreq is added by one at the STEP 7 and the number of vacant buffers is output at the STEP 5.

Figure 10:
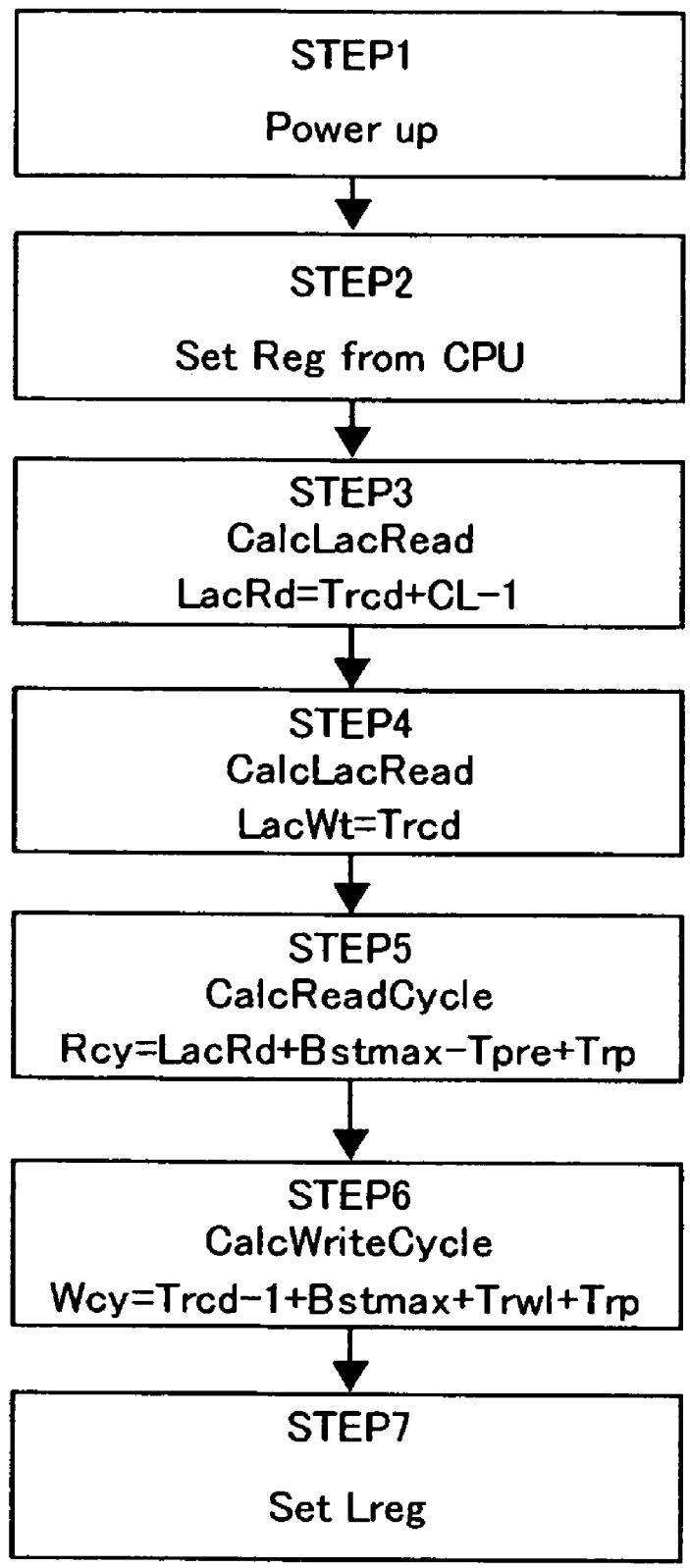
FIG. 10 is a flowchart showing a program procedure for the memory control circuit.

FIG. 10 is a flowchart showing a program procedure for the register circuit reg and the latency register circuit Lreg of the memory control circuit SDCON according to the example.

At STEP 1, the memory control circuit SDCON is turned ON. Immediately after the ON operation, the processing proceeds to STEP 2. At STEP 2, a minimum time (Trc, Trcd, Trp, Trw1, Tpre) between instructions for operating the SDRAM, a caslatency CL and a bus width of an input/output bus mbus of the SDRAM are set into 4 Bytes in the register circuit reg through the microcomputer MS0, for example (see FIGS. 2 and 3). At next STEP 3, the latency calculating circuit calc uses the minimum time (Trc, Trcd, Trp, Trw1, Tpre) between the instructions and the caslatency CL in the register circuit reg to calculate the latency LacRd in reading. At subsequent STEP 4, the latency LacWt in writing is calculated.

At next STEP 5, the read cycle latency Rcyc is calculated. At subsequent STEP 6, the write cycle latency Wcyc is calculated. At final STEP 7, the latency LacRd in reading, the latency LacWt in writing, the read cycle latency Rcyc and the write cycle latency Wcyc are set to the latency register circuit Lreg.

Figure 11:
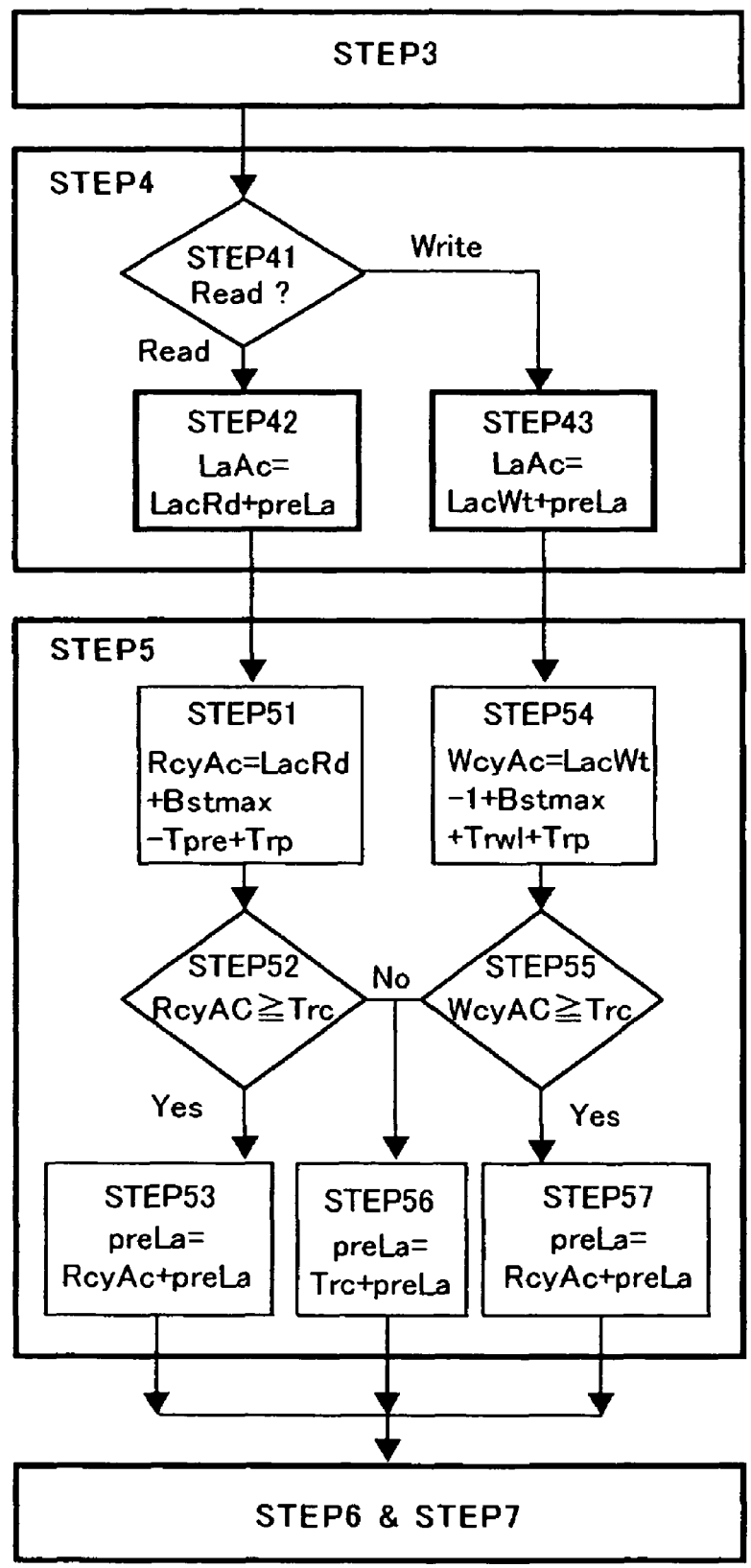
FIG. 11 is a detailed flowchart showing a main part in FIG. 8.

FIG. 11 shows the details of the processes in the STEP 4 and the STEP 5 in the flowchart of FIG. 8.

At the STEP 4, processes in STEP 41, STEP 42 and STEP 43 are carried out. At the STEP 5, processes of STEP 51, STEP 52, STEP 53, STEP 54, STEP 55, STEP 56 and STEP 57 are carried out.

At the STEP 3, it is decided whether an access request can be received or not. If the request can be received, the processing proceeds to the STEP 41.

At the STEP 41, it is decided whether the received access request is a read instruction or a write instruction. If the access request is the read instruction, the processing proceeds to the STEP 42. If the access request is the write instruction, the processing proceeds to the STEP 43.

At the STEP 42, the latency LacRd in reading and the execution waiting latency preLa are added to calculate the actual latency LaAC. Then, the processing proceeds to the STEP 51. At the STEP 51, the read cycle latency RcyAC is calculated. Then, the processing proceeds to the STEP 52. At the STEP 52, the read cycle latency RcyAC is compared with the cycle time Trc. If the read cycle latency RcyAC is equal to or greater than the cycle time Trc, the processing proceeds to the STEP 53. If the read cycle latency RcyAC is smaller than the cycle time Trc, the processing proceeds to the STEP 56.

At the STEP 53, a current execution waiting latency preLa is added to the read cycle latency RcyAC to calculate a new execution waiting latency preLa. At the STEP 56, the current execution waiting latency preLa is added to the cycle time Trc to calculate a new execution waiting latency preLa.

At the STEP 43, the latency LacWt in writing is added to the execution waiting latency preLa to calculate the actual latency LaAC. Then, the processing proceeds to the STEP 54. At the STEP 54, the write cycle latency WcyAC is calculated. Then, the processing proceeds to the STEP 55. At the STEP 55, the write cycle latency WcyAC is compared with the cycle time Trc. If the write cycle latency WcyAC is equal to or greater than the cycle time Trc, the processing proceeds to the STEP 57. If the write cycle latency WcyAC is smaller than the cycle time Trc, the processing proceeds to the STEP 56.

At the STEP 57, the current execution waiting latency preLa is added to the write cycle latency WcyAC to calculate a new execution waiting latency preLa. At the STEP 56, the current execution waiting latency preLa is added to the cycle time Trc to calculate a new execution waiting latency preLa.

Figure 12:
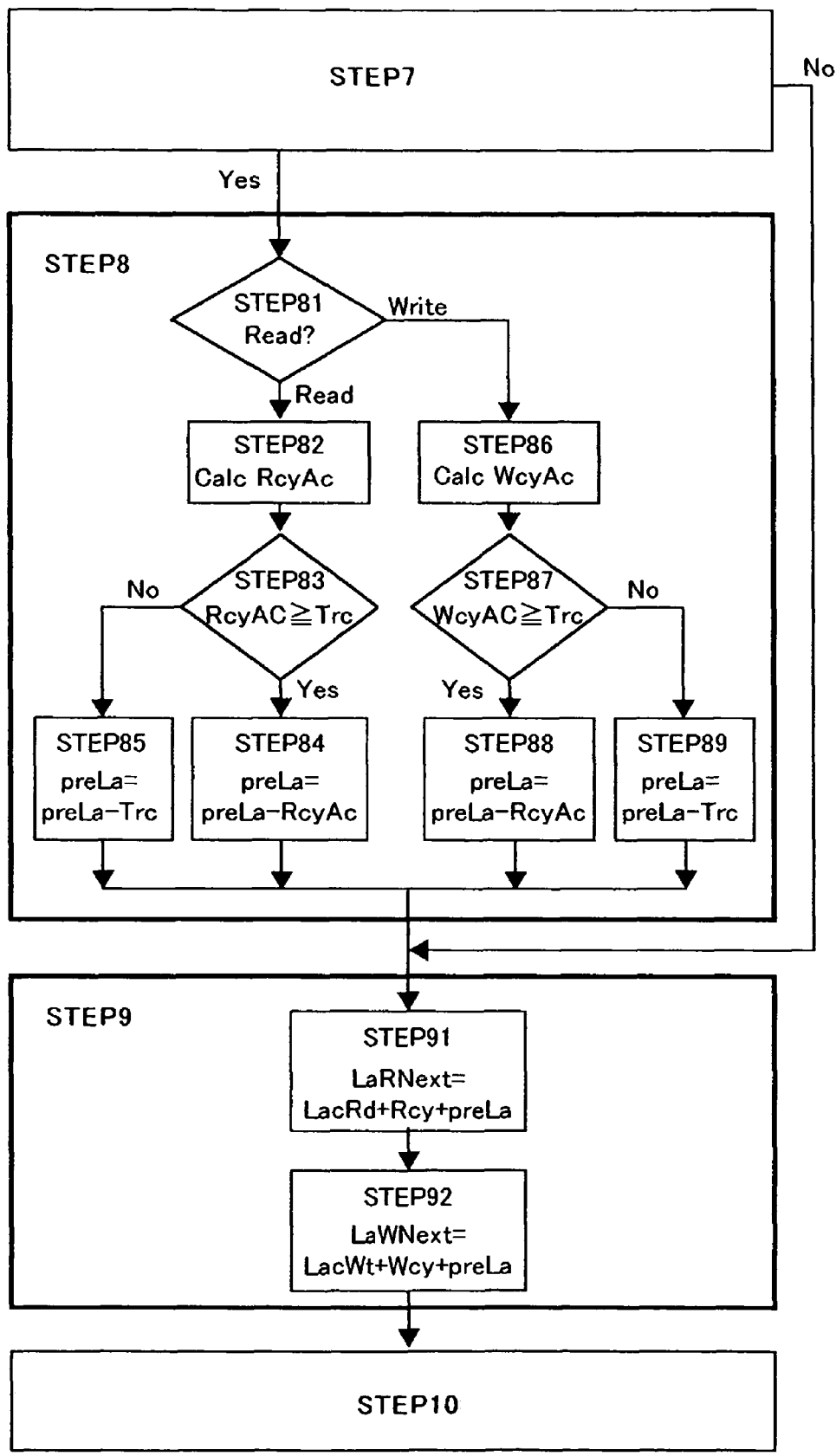
FIG. 12 is a detailed flowchart showing the main part in FIG. 8.

FIG. 12 shows the details of the processes of STEP 8 and STEP 9 in the flowchart shown in FIG. 8.

At the STEP 8, processes of STEP 81, STEP 82, STEP 83, STEP 84, STEP 85, STEP 86, STEP 87, STEP 88 and STEP 99 are carried out. At the STEP 9, processes of STEP 91 and STEP 92 are carried out.

At the STEP 7, the access request held in the buffers req0 to req3 are executed and completed, and it is decided whether a vacant state is newly generated in the buffers req0 to req3. If the vacant state of the buffers req0 to req3 is newly generated, the processing proceeds to the STEP 81. If the vacant state is not generated, the processing proceeds to the STEP 91

At the STEP 81, it is decided whether the received access request is a read instruction or a write instruction. If the access request is the read instruction, the processing proceeds to the STEP 82. If the access request is the write instruction, the processing proceeds to the STEP 86.

At the next STEP 82, the read cycle latency RcyAC is calculated. At the next STEP 83, the read cycle latency RcyAC is compared with the cycle time Trc. If the read cycle latency RcyAC is equal to or greater than the cycle time Trc, the processing proceeds to the STEP 84. If the read cycle latency RcyAC is smaller than the cycle time Trc, the processing proceeds to the STEP 85.

At the next STEP 84, the read cycle latency RcyAC is subtracted from the current execution waiting latency preLa to calculate a new execution waiting latency preLa. At the STEP 85, the cycle latency Trc is subtracted from the current execution waiting latency preLa to calculate a new execution waiting latency preLa.

At the next STEP 86, the write cycle latency WcyAC is calculated. At the next STEP 86, the write cycle latency WcyAC is compared with the cycle time Trc. If the write cycle latency WcyAC is equal to or greater than the cycle time Trc, the step proceeds to the STEP 88. If the write cycle latency WcyAC is smaller than the cycle time Trc, the processing proceeds to the STEP 89.

At the STEP 88, the write cycle latency WcyAC is subtracted from the current execution waiting latency preLa to calculate a new execution waiting latency preLa. At the STEP 89, the cycle latency Trc is subtracted from the current execution waiting latency preLa to calculate a new execution waiting latency preLa.

When the STEP 89 is completed, the processing subsequently proceeds to the STEP 91. At the STEP 91, the transfer enable read latency LaRNext is calculated. When the STEP 91 is completed, the processing proceeds to STEP 92. At the STEP 92, the transfer enable write latency LaWNext is calculated.

When the STEP 92 is completed, the processing proceeds to the STEP 10. At the STEP 10, the transfer enable read latency LaRNext and the transfer enable write latency LaWNext which are calculated are output.

According to the first embodiment, the following functions and advantages can be obtained.

(1) The microcomputer MS0, the image processing device MS1, the data input device MS2 and the data output device MS3 can always know a data arrival time and a state of the request buffer req0. Therefore, it is possible to flexibly regulate a range of a next processing which is to be carried out in advance till the data arrival time. Thus, it is possible to efficiently carry out the processing in the master.

(2) It is decided whether the request is satisfied for the request read latency from the master side or not, and furthermore, a data transfer permission is given to the access request having the smallest difference between the request read latency and the enable read latency. Consequently, it is possible to preferentially process a request having a high emergency degree while satisfying the request read latency. Therefore, it is possible to supply necessary data in a necessary time and to operate the whole system smoothly at a high speed.

Second Embodiment

Figure 13:
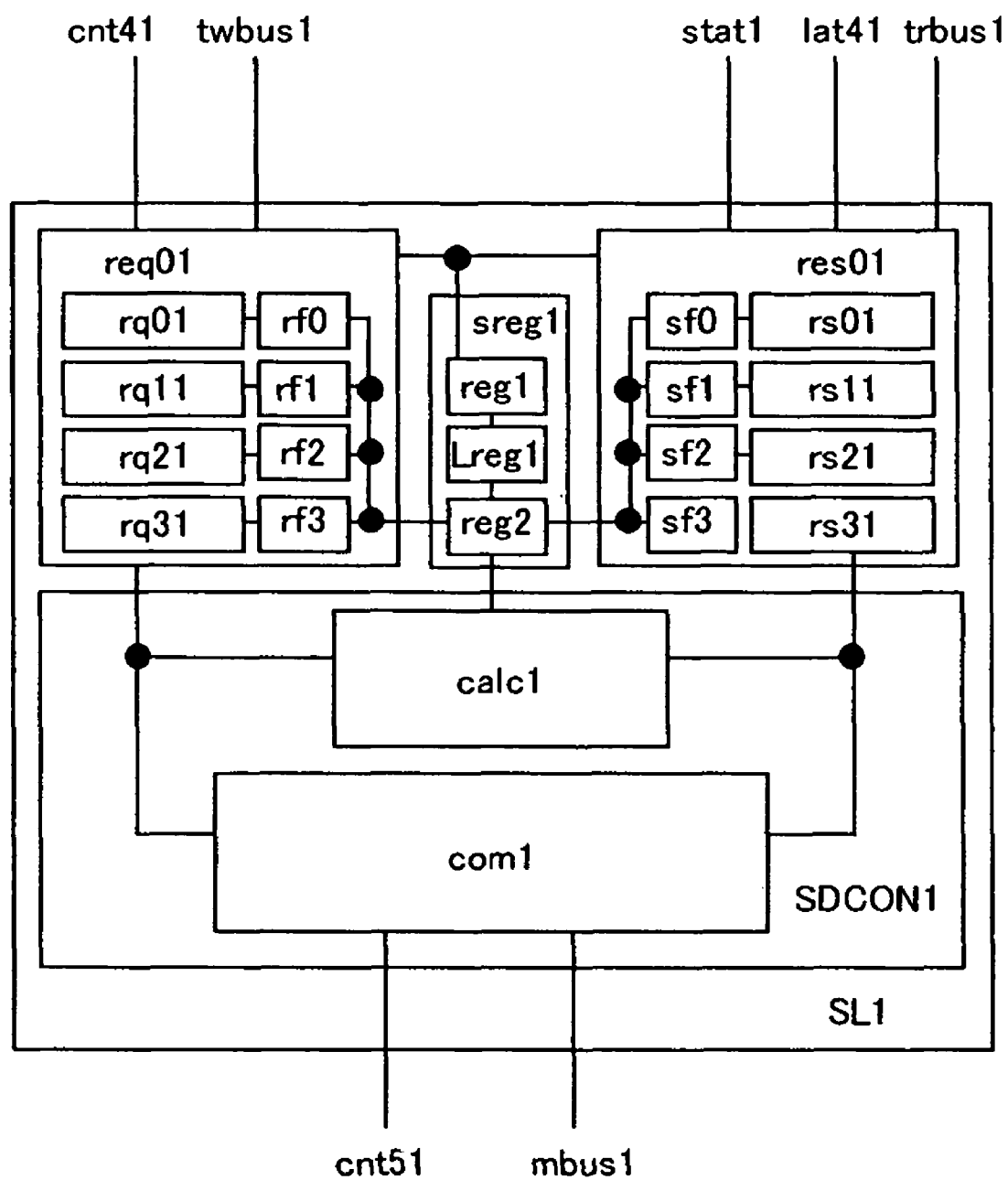
FIG. 13 is a block diagram showing another example of the structure of the memory control circuit.

FIG. 13 shows a memory control device SL1 according to another example of the structure of the memory control device SL0. Portions other than the control device are the same as those in the first embodiment.

The memory control device SL1 shown in FIG. 13 is constituted by a request buffer req01, a response buffer res01, a register circuit sreg1 and a memory control circuit SDCON1.

The request buffer req01 is constituted by buffers rq01, rq11, rq21 and rq31 and flag circuits rf0, rf1, rf2 and rf3. The response buffer res01 is constituted by buffers rs01, rs11, rs21 and rs31 and flag circuits sf0, sf1, sf2 and sf3. The register circuit sreg1 is constituted by a register circuit reg1, a latency register circuit Lreg1 and a register circuit reg2. The memory control circuit SDCON1 is constituted by a latency calculating circuit calc1 and a command generating circuit com1.

Immediately after a power supply is turned ON, the register circuit sreg1 is initialized by a microcomputer MS0, which is not particularly restricted. In the initialization, first of all, a write instruction is input through a signal cnt41 and buffer utilization information indicative of any of masters utilizing each of the buffers rq01, rq11, rq21 and rq31 and the buffers rs01, rs11, rs21 and rs31 is input through a data bus twbus1 and is set to the register circuit reg2.

In other words, a utilization right of a bus master is set to the buffer and other bus masters cannot be used for the buffer to which the utilization right is set. Next, the buffer utilization information of the register circuit reg2 is set to the flag circuits rf0, rf1, rf2 and rf3 and the flag circuits sf0, sf1, sf2 and sf3.

Furthermore, a write instruction is input through the signal cnt41 and data on a minimum time (Trc, Trcd, Trp, Trw1) between instructions for operating the SDRAM shown in FIG. 2, a caslatency CL, and a bus width of an input/output bus mbus1 of the SDRAM are input through the data bus twbus1 and are set to the register circuit reg1.

Next, the latency calculating circuit calc1 uses the minimum time (Trc, Trcd, Trp, Trw1) between the instructions and the caslatency CL to calculate a latency LacRd in reading, a latency LacWt in writing, a read cycle latency Rcyc and a write cycle latency Wcyc and to set them to the latency register circuit Lreg.

Description will be given to an operation to be carried out when an access request is generated in the case in which such information as to utilize only a data input circuit MS2 is set to the flag circuits rf0 and sf0, such information as to utilize only a data output circuit MS3 is set to the flag circuits rf1 and sf1, such information as to utilize only an information processing MS0 is set to the flag circuits rf2 and sf2, and such information as to utilize only an image processing device MS1 is set to the flag circuits rf3 and sf3 by the buffer utilization information of the register circuit reg2, which is not particularly restricted.

The buffer rq01 accepts only an access request from the data input circuit MS2 and the buffer rs01 processes only a response to an access request sent from the data input circuit MS2. The buffer rq11 accepts only an access request from the data output circuit MS3 and the buffer rs11 processes only a response to the access request sent from the data output circuit MS3. The buffer rq21 accepts only an access request sent from the microcomputer MS0 and the buffer rs21 processes only a response to the access requests from the microcomputer MS0 and the data.

The rq31 accepts only an access request sent from an image processing device MS1 and the buffer rs31 processes only a response to the access request sent from the image processing device MS1.

The operations of the latency calculating circuit calc1 and the command generating circuit com1 are identical to those of the latency calculating circuit calc and the command generating circuit com according to the first embodiment, respectively.

An access request is input from each master through the control signal cnt41. Write data are input through the data bus twbus1 and read data are output from a data bus trbus1. The number of vacant buffers and a transfer enable latency (a transfer enable read latency and a transfer enable write latency) are output through a control signal stat1 and an actual latency (an actual read latency and an actual write latency) is output through a control signal lat41.

An instruction for controlling a memory device MEM0 is output through the control signal cnt41. Read data are transferred from the memory device MEM0 to a memory control device SL1 through a data bus mbus1, and write data are transferred from the memory control device SL1 to the memory device MEM0.

Next, description will be given to an operation to be carried out when an access request is waited in a state in which the buffers rq01 and rq11 in the request buffer req01 of the memory control device SL1 and the buffers rs01 and rs11 in the response buffer res01 are vacant.

A transfer enable latency in the case in which an access request is accepted at a present time and the number of any of current request buffers which are vacant, that is, the number of vacant buffers are transmitted to an access arbitrating device ARB through the status signal stat1 while the memory control device SL1 waits for the access request.

In the example, the buffer req01 is set in a vacant state and is utilized for only the data input circuit MS2. Therefore, the fact that the number of vacant buffers is one is transmitted to the data input circuit MS2 through the access arbitrating circuit ARB.

Moreover, a buffer req11 is also set in a vacant state and a buffer rq1 is utilized for only the data output circuit MS3. Therefore, the fact that the number of vacant request buffers is one is transmitted to the data output circuit MS3 through the access arbitrating device ARB.

The buffers req 21 and req31 are set in an occupation state in which the requests are held, and are utilized for only the microcomputer MS0 and the image processing device MS1, respectively. Therefore, the fact that the number of vacant buffers is zero is transmitted to the microcomputer MS0 and the image processing device MS1 through the access arbitrating device ARB.

In the case in which the access requests are given from the microcomputer MS0, the image processing device MS1, the data input circuit MS2 and the data output circuit MS3, the access arbitrating device decides whether any of the request buffers which can be utilized by the master is vacant. If any of the buffers is vacant, the access request is transferred to the memory control circuit.

There is no request buffer which is vacant for the access requests given from the microcomputer MS0 and the image processing device MS1. The requests given from these masters are not transferred from the access arbitrating device ARB to the memory control device SL1.

One request buffer is vacant for the access request given from each of the data input circuit MS2 and the output circuit MS3. For this reason, the access arbitrating device ARB transfers the access requests from these masters to the memory control device SL1.

The access request thus accepted is processed by the latency calculating circuit calc1 and a memory control circuit ct11 in the same manner as in the first embodiment, and the actual latency is output through the signal lat41 and the number of vacant buffers and the transfer enable latency are output from the status signal stat1.

According to the second embodiment described above, it is possible to set the utilization rights of the buffers rq01, rq11, rq21 and rq31 constituting the request buffer req01 and the buffers rs01, rs11, rs21 and rs31 constituting the response buffer res01 for each master. For this reason, the request buffer req01 and the response buffer res01 can be prevented from being occupied at the requests given from the other masters. Consequently, an access confliction is not generated but necessary data can be supplied in a necessary time and the whole system can be operated smoothly at a high speed.

Furthermore, the master for giving access to the memory can always know a data transfer time for its own access request. Therefore, a next processing can be efficiently executed in advance and the high-speed processing of the whole system can be carried out.

Third Embodiment

Figure 14:
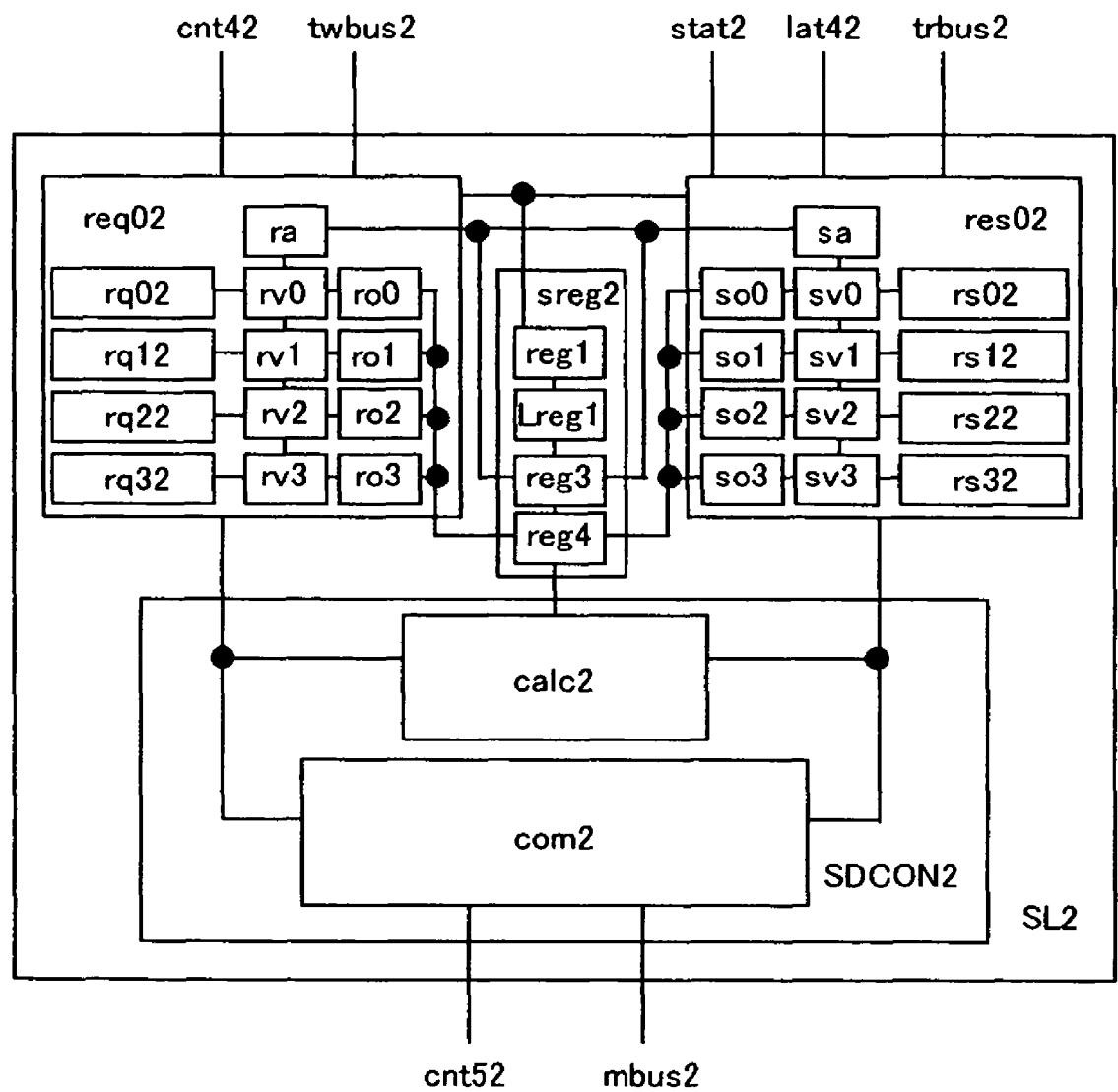
FIG. 14 is a block diagram showing a further example of the structure of the memory control circuit.

FIG. 14 shows a memory control circuit SL2 according to another example of the structure of the memory control circuit SL1. Portions other than the memory control circuit are identical to those of the first and second embodiments.

The memory control circuit SL2 shown in FIG. 14 is constituted by a request buffer req02, a response buffer res02, a register circuit sreg2, a calculating device calc2 and a memory control circuit SDCON2.

The request buffer req02 includes buffers ra, rq02, rq12, rq22 and rq32, flag circuits ro0, ro1, ro2 and ro3, and flag circuits rv0, rv1, rv2 and rv3. The response buffer res02 is constituted by buffers sa, rs02, rs12, rs22 and rs32, flag circuits so0, so1, so2 and so3, and flag circuits sv0, sv1, sv2 and sv3.

The flag circuits ro0, ro1, ro2 and ro3 correspond to the flag circuits rf0 to rf3 in FIG. 13. The flag circuits so0 to s03 correspond to the flag circuits sf0 to sf3 shown in FIG. 13. The latency calculating circuit calc2 and the command generating circuit com2 have the same functions as those of the latency calculating circuit calc and the command generating circuit com in the first embodiment, respectively.

A flag can be set to the flag circuits ro0 to ro3 and the flag circuits so0 to so3 by the execution of a predetermined boot program through a microcomputer MS0 immediately after a power supply is turned ON. In the case in which the flag is set in the flag circuits ro0 to ro3 and the flag circuits so0 to so3, in other words, the case in which a utilization right of a bus master is set, the bus corresponding thereto is occupied by the bus master. In the case in which the flag is not set in the flag circuits ro0 to ro3 and the flag circuits so0 to so3, moreover, the buffer corresponding thereto can be reserved as follows.

The buffers ra and sa hold a buffer reservation instruction and a buffer reservation cancel instruction which are input through a control signal cnt42.

The flag circuits rv0, rv1, rv2 and rv3 hold signals indicating whether the buffers rq02, rq12, rq22 and rq32 are set in a reservation state or not, respectively.

Moreover, the flag circuits sv0, sv1, sv2 and sv3 hold signals indicating whether the buffers rs02, rs12, rs22 and rs32 are set in the reservation state or not, respectively.

A register circuit sreg2 is constituted by the register circuit reg1, the latency register circuit Lreg1, the circuit calc2, and the command generating circuit com2.

The register circuit reg1, the latency register circuit Lreg1 and the memory control circuit SDCON2 carry out the same operation as the latency calculating circuit calc2, and the command generating circuit com2 carries out the same operation as that in the first embodiment.

An access request is input from each master through a signal cnt52. Write data are input through a data bus twbus2 and read data are output through a data bus trbus2.

The number of vacant buffers and a transfer enable latency (a transfer enable read latency and a transfer enable write latency) are output through a status signal stat2, and an actual latency (an actual read latency and an actual write latency) is output through the latency signal lat42.

An instruction for controlling a memory device MEM0 is output through the control signal cnt52. The read data are transferred from the memory device MEM0 to the memory control device SL2 through an input/output data bus mbus2, and the write data are transferred from the memory control device SL2 to the memory device MEM0.

Immediately after the power supply is turned ON, the microcomputer MS0 executes the boot program. Consequently, an access request including a write instruction is input through the control signal cnt42, and is set to a register circuit reg3 to which a master number mn and the maximum number of reservation buffers corresponding to the master number mn are input through the data bus twbus2.

Depending on the master number and the maximum number of reservation buffers, it is possible to know any of masters which can reserve the buffers and the number of the buffers.

Next, a store instruction is input through the signal cnt42, and data on a minimum time (Trc, Trcd, Trp, Trw1, Tpre) between instructions for operating the SDRAM shown in FIGS. 2 and 3, a caslatency CL and a bus width of the input/output bus mbus2 of the SDRAM are input through the data bus twbus2, and they are set to the register circuit reg1.

Subsequently, the latency calculating circuit calc2 uses the minimum time (Trc, Trcd, Trp, Trw1, CL) between instructions to calculate a latency LacRd in reading, a latency LacWt in writing, a read cycle latency Rcyc and a write cycle latency Wcyc and to set them to the latency register circuit Lreg1.

Description will be given to an operation to be carried out when the access request is generated from the data output device M3 in the case in which the buffers rq02, rq12 and rq22 hold the request of the image processing device MS1, the buffer rq32 is set in the vacant state, the buffers rs02, rs12 and rs22 hold read data for the access request of the image processing device MS1 and the buffer rs32 is set in the vacant state, which is not particularly restricted.

The data output device MS3 transmits a buffer reservation request and a value of 3 of a master identification number mid to an access arbitrating device ARB through a control signal cnt3. The access arbitrating device ARB transmits the buffer reservation request and the value of 3 of the master identification number mid to the memory control device SL2 through the cnt42.

The buffer reservation request and the value of 3 of the master identification number mid which are input are held in the buffers ra and sa.

Next, the buffer ra decides whether a master number mn held in the register circuit reg3 has the value of 3 of the master identification number mid or not.

If there is the master number mn which is coincident with the value of 3 of the identification number mid, information sent from the buffers rv0 to rv3 are retrieved to search for any of the buffers rq02 to rq32 which is vacant.

In case of the buffer rq32 in the vacant state, a reservation is carried out for the buffer rq32. In that case, the value of 3 of the identification number mid is held in the buffer rv3 and the buffer rq32 can be utilized by only the data output device MS3.

If neither of the buffers rq02 to rq32 is set in the vacant state, moreover, the reservation is carried out for any of them which are first brought into the vacant state. In the case in which the buffer rq32 is first brought into the vacant state, the reservation is carried out for the buffer rq32. In that case, the value of 3 of the identification number mid is held in the buffer rv3 and the buffer rq32 can be utilized by only the data output device MS3.

Next, the buffer sa decides whether or not the value of 3 of the master identification number min is present in the master number mn held in the register circuit reg3. If there is the master number mn which is coincident with the value of 3 of the identification number mid, information in the buffers sv0 to sv3 are retrieved to search for any of the buffers rs02 to rs32 which is vacant.

In case of the buffer rs32 in the vacant state, a reservation is carried out for the buffer rs32. In that case, the value of 3 of the identification number mid is held in the buffer sv3 and the buffer rs32 can be utilized by only the data output device MS3.

If neither of the buffers rs02 to rs32 is set in the vacant state, moreover, the reservation is carried out for any of them which are first brought into the vacant state. In the case in which the buffer rs32 is first brought into the vacant state, the reservation is carried out for the buffer rs32. In that case, the value of 3 of the identification number mid is held in the buffer sv3 and the buffer rs32 can be utilized by only the data output device MS3.

When the reservation of the buffer is completed, a reservation completion signal giving a notice of the completion of the reservation and the value of 3 of the identification number mid are transmitted to the access arbitrating device ARB through the signal stat2. In the case in which an access request including a read instruction is generated from the data output circuit MS3, then, the buffers rq32 and rs32 can be utilized for only the data output circuit MS3. Therefore, a request of the data output circuit MS3 is caused to enter the buffer rq32. Thereafter, the same request is processed in the latency calculating circuit calc2 and a memory control circuit ctl2, and data are read from a memory device M0 and are transferred to the buffer rs32. Next, the buffer rs32 outputs data to the access arbitrating device ARB through the read data bus trbus2. Moreover, the value of 3 of the identification number mid is transmitted to the access arbitrating device ARB through the signal stat2.

The access arbitrating device ARB outputs data to the data output device MS3 through a data bus rbus. Moreover, the value of 3 of the identification number mid is transmitted to the data output device MS3 through a signal rstat.

Next, description will be given to the reservation cancel of the buffer.

The data output device MS3 transmits a buffer reservation cancel request and the value of 3 of the master identification number mid to the access arbitrating device ARB through the control signal cnt3. The access arbitrating device ARB transmits the buffer reservation cancel request and the value of 3 of the master identification number mid to the memory control device SL2 through the cnt 42.

The buffer reservation cancel request and the value of 3 of the master identification number mid which are input are held in the buffers ra and sa.

Next, the buffer ra decides whether the master number mn held in the register circuit reg3 has the value of 3 of the master identification number mid or not. If there is the master number mn which is coincident with the value of 3 of the identification number mid, information in the buffers rv0 to rv3 are retrieved to search for any of the buffers rq02 to rq32 which is reserved by the data output device MS3. In the example, the reservation cancel is carried out for the reserved buffers rq32 and rs32. After the reservation cancel, the buffers rq32 and rs32 can be utilized for all of the masters.

When the reservation cancel of the buffer is completed, a reservation cancel completion signal for giving a notice of the completion of a reservation cancel and the value of 3 of the identification number mid are transmitted to the access arbitrating device ARB through the status signal stat2. Furthermore, the access arbitrating device ARB transmits the reservation cancel completion signal and the value of 3 of the identification number mid to the data output device MS3 through the signal rstat. Consequently, the data output device MS3 can know that the reservation cancel is completed. If the master number mn held in the register reg3 is not coincident with the value of 3 of the master identification number mid, moreover, master number non-coincidence information and the value of 3 of the master identification number mid are transmitted to the access arbitrating device ARB through the status signal stat2. Furthermore, the access arbitrating device ARB transmits the master number non-coincidence information and the value of 3 of the identification number mid to the data output device MS3 through the signal rstat. Consequently, the data output device MS3 can know that the reservation cannot be carried out.

According to the embodiment described above for each of the masters, the buffers rq01, rq11, rq21 and rq31 constituting the request buffer req01 and the buffers rs01, rs11, rs21 and rs31 constituting the response buffer res01 are reserved in necessary numbers for a necessary time zone, and a utilization right can be set. Therefore, there is no possibility that the request buffer req01 and the response buffer res01 might be occupied by requests given from the other masters. Thus, it is possible to supply the necessary data before a necessary time and to operate the whole system smoothly at a high speed without generating an access confliction in only the necessary time zone.

Furthermore, the buffer ra, the flag circuits rv0, rv1, rv2 and rv3, the buffer sa, and the flag circuits sv0, sv1, sv2 and sv3 can be rewritten by a third party, while ro0, ro1, ro2, ro3, so0, so1, so2 and so3 can be rewritten only in the case in which the boot program is executed. In the boot, write cannot be carried out by the third party. According to the structure shown in FIG. 14, therefore, it is possible to reliably form the occupation state of the buffer, and furthermore, to cope with the reservation if necessary.

Fourth Embodiment

Figure 15:
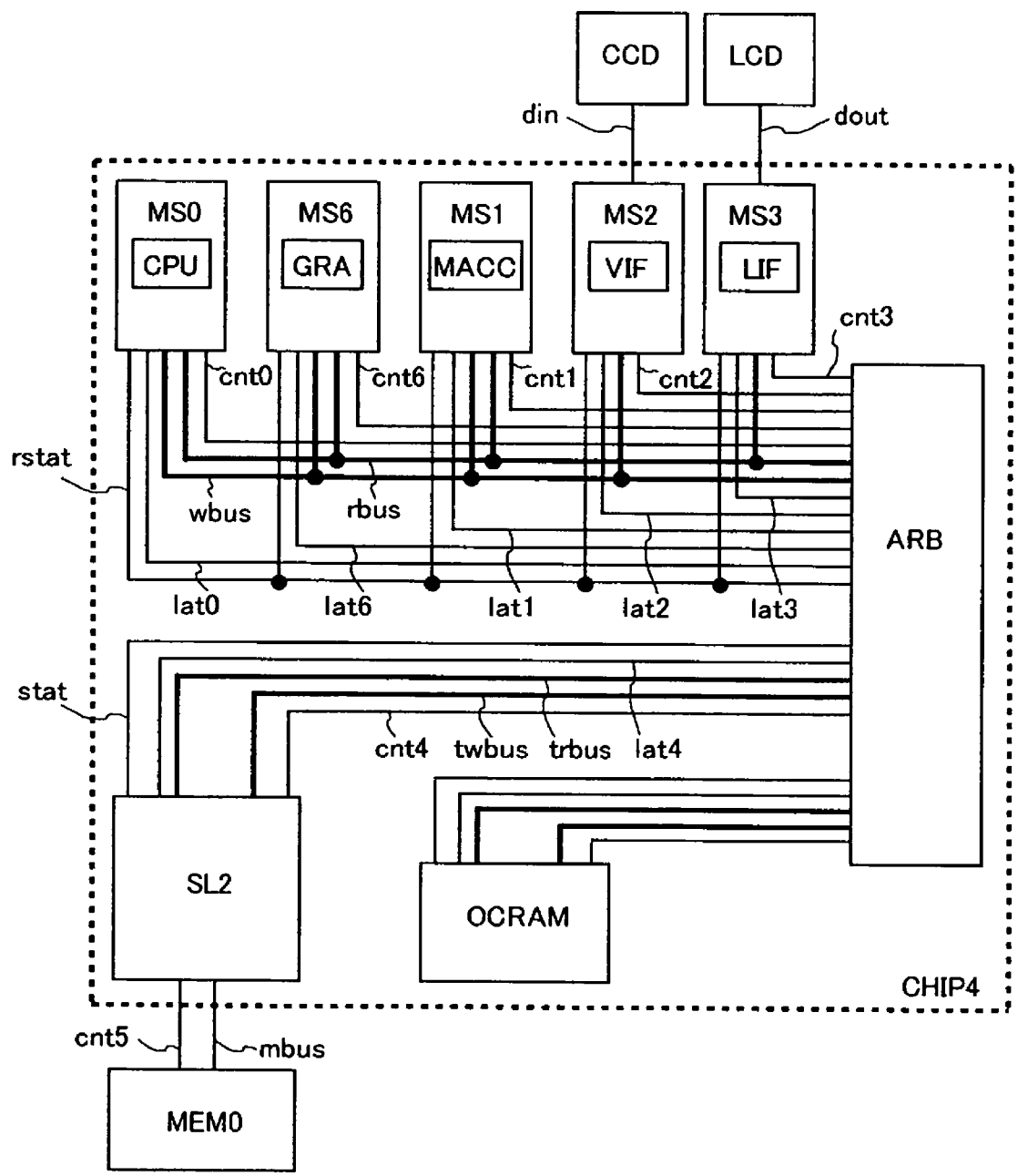
FIG. 15 is a block diagram showing another example of the structure of the information processor system.

FIG. 15 shows a further example of the structure of the information processor system which applies the invention.

The information processor system shown in FIG. 15 is constituted to include a microcomputer MS0 provided with a central calculating circuit CPU, a graphic processing device MS6 provided with a graphic circuit, an image processing device MS1 provided with a data compressing/expanding circuit MACC, a data input device MS2, a data output device MS3, an access arbitrating device ARB, a memory control device SL2, an image pick-up device CCD, an image display device LCD, a memory device MEM0 and an integral memory device OCRAM. The information processing device is operated synchronously with a clock CLK.

The microcomputer MS0, the graphic processing device MS6, the image processing device MS1, the data input device MS2, the data output device MS3, the access arbitrating device ARB, the memory control device SL2 and the integral memory device OCRAM are formed on the same substrate CHIP4, which is not particularly restricted.

The memory device MEM0 and the integral memory device OCRAM can be constituted by a DRAM, an SRAM and a nonvolatile memory, which is not particularly restricted.

The microcomputer MS0, the image processing device MS1, the data input device MS2, the data output device MS3, the access arbitrating device ARB and the integral memory device OCRAM carry out the same operations as those of the respective devices described in the first embodiment.

While the memory control functions described in the first, second and third embodiments can be implemented in the memory control circuit SL2, the memory control function described in the third embodiment is implemented in the example.

In a three-dimensional graphic processing, a geometry processing is carried out and a rendering processing is then executed. The geometry processing is not particularly restricted but a coordinate calculation for a graphic is carried out in order to represent a three-dimensional graphic in a processing to be performed by the microcomputer MS0. The rendering processing is carried out by the image processing device MS1 and serves to add a visual effect of a color, a brightness, a depth and a pattern to the three-dimensional graphic after the execution of the geometry processing in order to perform a display over the image display device LCD.

The three-dimensional image is stored in the memory device MEM0, and a current three-dimensional image is read, the microcomputer MS0 carries out the geometry processing, and then, the graphic processing device MS6 performs the rendering processing to generate a new three-dimensional image, and the same three dimensional image is stored in the memory device MEM0. Finally, the three-dimensional image thus generated is transferred to the output device MS3 and is displayed on the image display device LCD.

In the 3D graphic processing, thus, the microcomputer MS0, the graphic processing device MS6 and the image output device MS3 give access to the memory device MEM0.

In such a three-dimensional graphic processing, it is necessary to carry out the geometry processing, the rendering processing and the display at the same time and to perform the 3D graphic processing corresponding to 30 screens in one second.

As described above, also in the graphic processing, the invention is applied. Consequently, it is possible to supply necessary data before a necessary time and to smoothly operate the whole system at a high speed.

Furthermore, a bus master for giving access to a memory can always know a data transfer time for its own access request. Therefore, a next processing can be efficiently executed in advance and the whole system can be processed at a high speed.

In the case in which the picture recording of a dynamic image and the 3D graphic processing are to be carried out at the same time, all of the microcomputer MS0, the image processing device MS1, the graphic processing device MS6, the image input device MS2 and the image output device MS3 act as the bus masters to give access to the memory device MEM0.

The microcomputer MS0 can determine a storage region in the memory device MEM0 in such a manner that the recorded dynamic image and the three-dimensional graphic image are not rewritten with each other, which is not particularly restricted.

Furthermore, the image output device MS3 decides a screen of the display device LCD into a screen for picture recording and a screen for a 3D graphic to carry out a display in accordance with an instruction of the microcomputer MS0, which is not particularly restricted.

As described above, also in the case in which the graphic processing and the dynamic image recording are to be carried out at the same time, the invention is applied. Consequently, it is possible to supply necessary data in a necessary time and to smoothly operate the whole system at a high speed. Furthermore, the bus master for giving access to a memory can always know a data transfer time for its own access request. Therefore, it is possible to efficiently execute a next processing in advance and to carry out the high-speed processing of the whole system.

Fifth Embodiment

Figure 16:
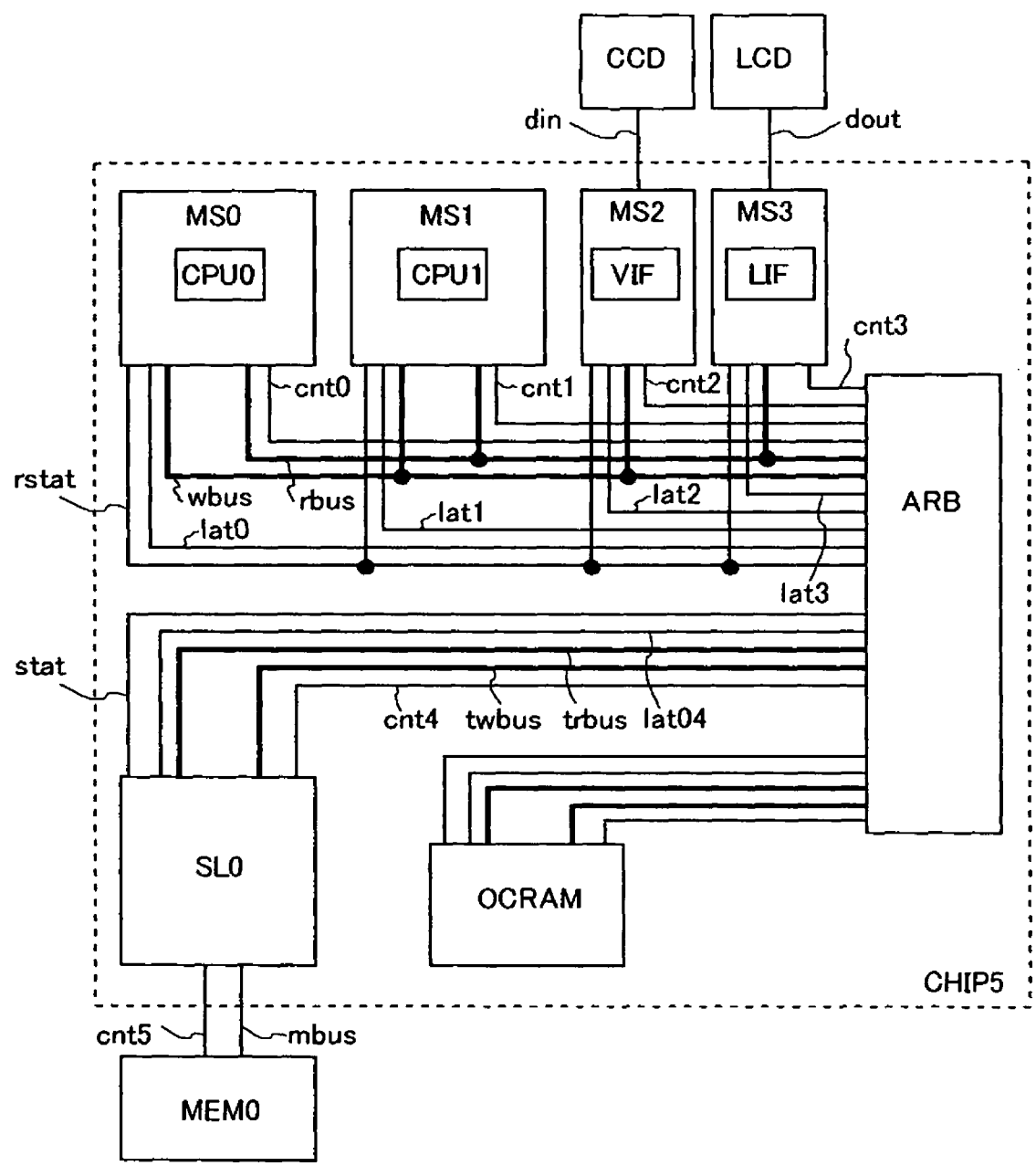
FIG. 16 is a block diagram showing a further example of the structure of the information processor system.

FIG. 16 shows a further example of the structure of the information processor system according to the invention.

The information processor system shown in FIG. 16 is constituted to include a microcomputer MS0 provided with a central calculating circuit CPU0, an image processing device MS1 provided with a central calculating circuit CPU1, a data input device MS2, a data output device MS3, an access arbitrating device ARB, a memory control device SL0, an image pick-up device CCD, an image display device LCD, a memory device MEM0 and an integral memory device OCRAM. The information processing device is operated synchronously with a clock CLK.

The microcomputer MS0, the image processing device MS1, the data input device MS2, the data output device MS3, the access arbitrating device ARB and the integral memory device OCRAM carry out the same operations as those of the respective devices described in the first embodiment.

While the memory control methods described in the first, second and third embodiments can be implemented in the memory control device SL0, the memory control method described in the first embodiment is implemented in the example.

The microcomputer MS0, the image processing device MS1, the data input device MS2, the data output device MS3, the access arbitrating device ARB, the memory control device SL0 and the integral memory device OCRAM are formed on the same substrate, and an information processing device CHIP5 can also be formed, which is not particularly restricted.

The memory device MEM0 and the integral memory device OCRAM can also be constituted by a volatile memory such as a DRAM or an SRAM and a nonvolatile memory, which is not particularly restricted.

The microcomputer MS0 can carry out, in software, a data compression/expansion processing implemented in hardware, and the image processing device MS1 can carry out, in software, the graphic processing implemented in hardware.

Also in the case in which a plurality of information processing devices provided with the central calculating circuit CPU is utilized, accordingly, the invention is applied. Consequently, it is possible to supply necessary data in a necessary time and to smoothly operate the whole system at a high speed.

By executing the processing in software, furthermore, it is possible to quickly correspond to various compressing/expanding standards. Furthermore, it is possible to easily expand a new function.

While an information processing unit constituted by a plurality of bus masters for giving access to a memory and a memory control unit constituted by an access arbitrating device and a memory control device may be formed on separate semiconductor chips, both of them may be formed on a single semiconductor chip. In that case, the information processing device formed on the single semiconductor chip can cause data buses rbus and wbus to have greater widths than those in the case in which they are formed on separate semiconductor chips, and furthermore, a distance between both of them can be reduced. Consequently, it is possible to carry out a high-speed data transfer between both of them.

Furthermore, it is also possible to obtain a one-chip information processing device by causing another person to design only a memory control unit or forming the memory control unit on the same semiconductor chip as the information processing unit as a design property which has already been designed.

In this case, the structure of the circuit of the memory control device can be recorded on a recording medium and can be offered to a designer of an information processing portion or that of an information processing device.

In the case in which a person manufactures a semiconductor device by himself (herself), moreover, it is also possible to combine the memory control unit according to the invention or the memory control unit and a memory device with an information processing unit provided by other people, thereby offering and supplying a semiconductor device to the other people.

On the other hand, it is also possible to provide the memory control unit in the memory. The memory control unit is formed in the information processing unit or a memory module so that a load of a manufacturer of the information processor system can be reduced and a size of the information processor system can also be decreased.

Moreover, it is also possible to form the memory on the same semiconductor chip as the information processing device partially or wholly in accordance with the progress of the manufacturing process of the semiconductor device. In other words, the one-chip information processor system can be implemented so that the size of the system can be reduced still more.

Figure 17:
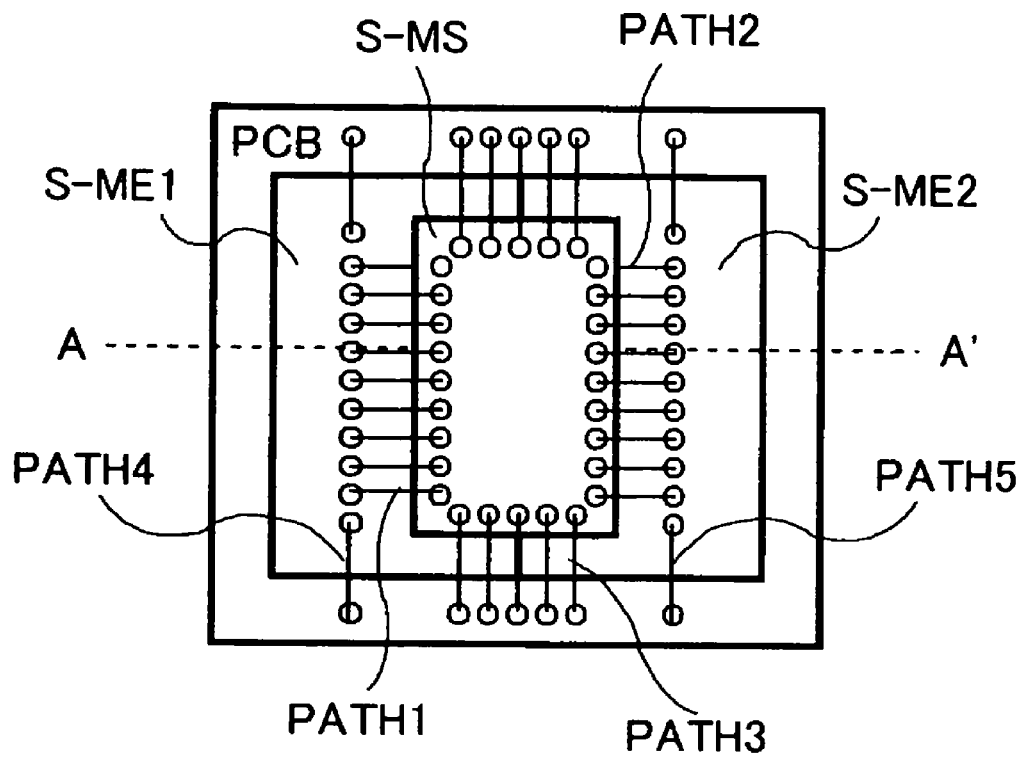
FIG. 17 is a plan view showing a state in which the information processor system is sealed with a package.
Figure 18:
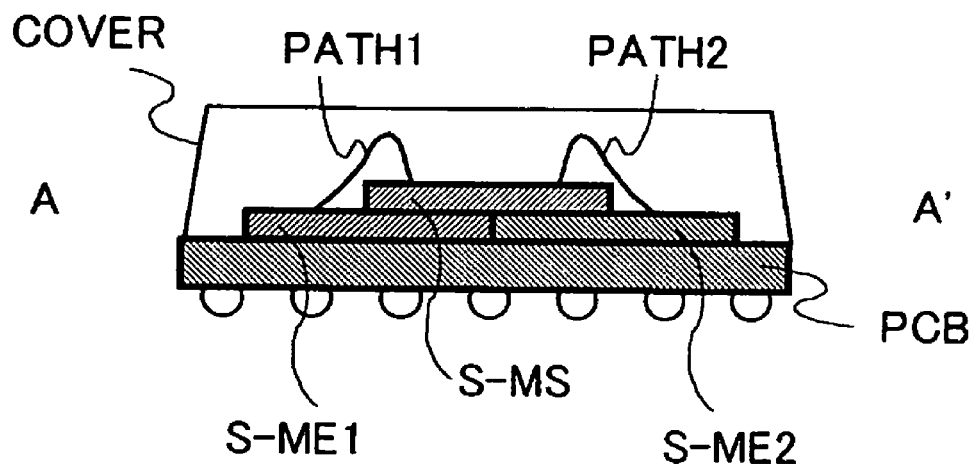
FIG. 18 is a sectional view taken along an A-A' line in FIG. 17.

Furthermore, FIG. 17 shows an example of a package and FIG. 18 shows a section taken along an A-A' line in FIG. 17. In FIG. 17, a cover COVER in FIG. 18 is omitted. As shown in FIGS. 17 and 18, it is possible to seal, with one package, a module including an information processing device S-MS formed by a single chip and memory devices S-ME1 and S-ME2 formed by a single chip respectively. This structure has been known as a multichip module or a multichip package. The information processing device S-MS corresponds to the information processing device CHIP1 in FIG. 1 and the memory device S-ME1 corresponds to the memory MEM0 in FIG. 1.

Figure 19:
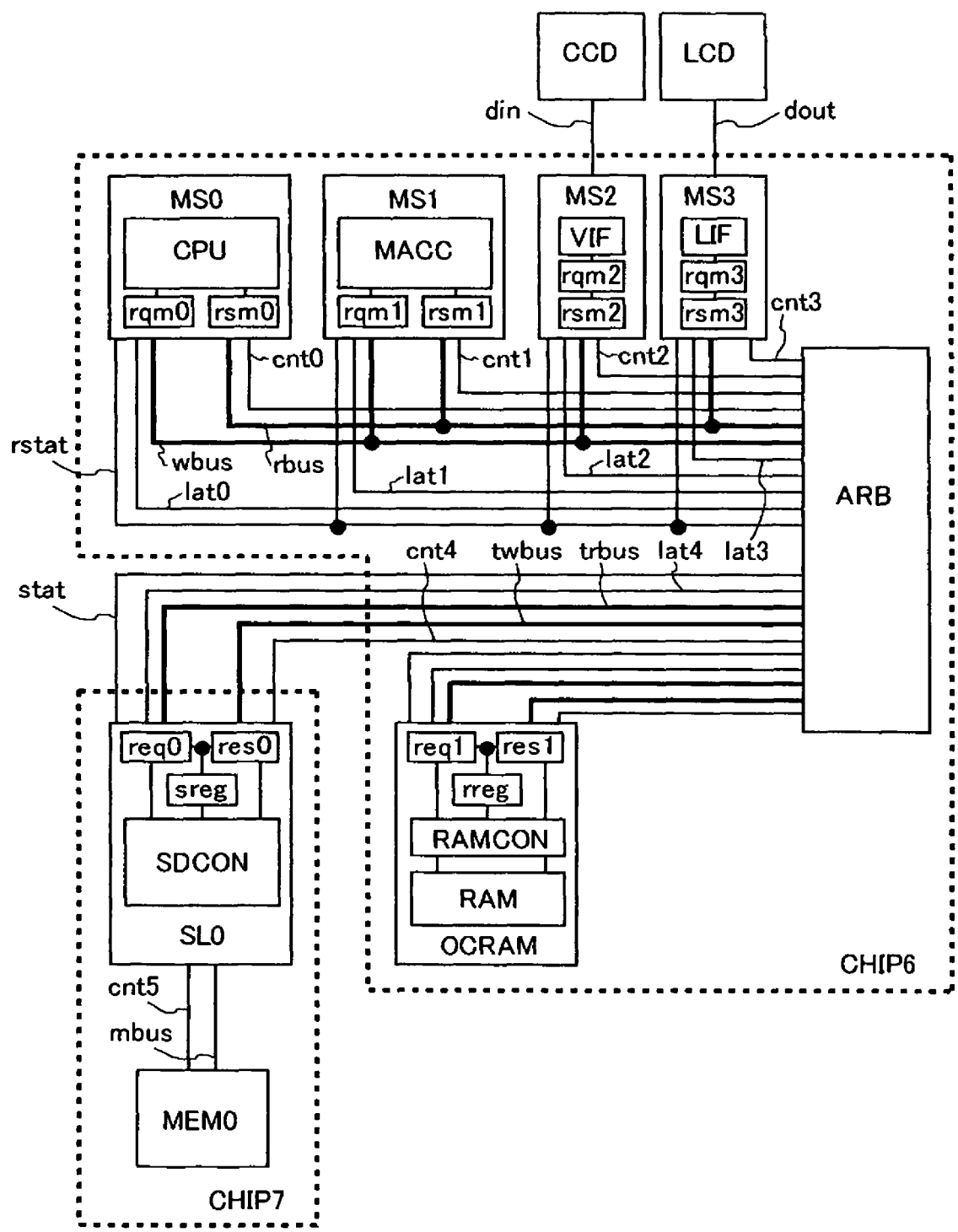
FIG. 19 is a block diagram showing a further example of the structure of the information processor system.

FIG. 19 shows another example of the structure of the information processing device according to the invention. FIG. 19 is greatly different from FIG. 1 in that a memory device MEM0 and a memory control device SL0 for controlling the operation are included in one memory chip CHIP7. Thus, it is also possible to produce the same functions and advantages as those in the example.

While the description has been given to the embodiment of the information processor system which can supply necessary data for access requests given from a plurality of bus masters to them in a necessary time, the invention is not restricted to the embodiments but other various embodiments can be employed without departing from the thought of the invention.

While the invention made by the inventor has been specifically described above, it is apparent that the invention is not restricted thereto but various changes can be made without departing from the scope of the invention.

Although the description has been mainly given to the case in which the invention made by the inventor is applied to the system capable of carrying out an image processing to be an applicability which is the background thereof, the invention is not restricted thereto but can be widely applied to a system capable of carrying out an information processing.

The invention can be applied on the condition that a plurality of bus masters is included.

What is claimed is:

1. An information processor system comprising:
   a memory device;
   a memory control device capable of controlling an operation of the memory device, and
   a plurality of bus masters each capable of giving access to the memory through the memory control device,
   wherein each bus master includes a notification function to indicate, to the memory control device, a maximum allowable time within which the bus master requires receipt of data requested from the memory device.

2. The information processor system according to claim 1, further comprising an access arbitrating device for arbitrating a confliction of access requests given from the bus masters and arbitrating the information about maximum allowable times given from the bus masters.

3. The information processor system according to claim 2, wherein the memory control device determines an access order for the memory based on the information about maximum allowable times.

4. The information processor system according to claim 3, wherein the memory control device can change the access order corresponding to an access situation of the memory for the access requests sent from the bus masters.

* * * * *